United States Patent
Shan et al.

(10) Patent No.: US 12,026,162 B2
(45) Date of Patent: Jul. 2, 2024

(54) DATA QUERY METHOD AND APPARATUS, COMPUTING DEVICE, AND STORAGE MEDIUM

(71) Applicant: Huawei Cloud Computing Technologies Co., Ltd., Guizhou (CN)

(72) Inventors: Weihua Shan, Xi'an (CN); Yixuan Dai, Changsha (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/702,479

(22) Filed: Mar. 23, 2022

(65) Prior Publication Data

US 2022/0215021 A1    Jul. 7, 2022

Related U.S. Application Data

(63) Continuation of application No. PCT/CN2020/117269, filed on Sep. 24, 2020.

(30) Foreign Application Priority Data

Sep. 24, 2019 (CN) .......................... 201910907480.2
Mar. 31, 2020 (CN) .......................... 202010247340.X

(51) Int. Cl.
*G06F 7/00* (2006.01)
*G06F 16/2455* (2019.01)
*G06F 16/28* (2019.01)

(52) U.S. Cl.
CPC ........ *G06F 16/2455* (2019.01); *G06F 16/283* (2019.01); *G06F 16/285* (2019.01)

(58) Field of Classification Search
CPC ... G06F 16/2455; G06F 16/285; G06F 16/283
USPC .................................. 707/600–899; 607/737
See application file for complete search history.

(56) References Cited

U.S. PATENT DOCUMENTS

| 10,650,012 B1 * | 5/2020 | Wroblewski .......... G06F 16/245 |
| 2013/0254212 A1 | 9/2013 | Rao et al. |
| 2017/0068688 A1 * | 3/2017 | Brodt .................. G06F 16/2264 |

FOREIGN PATENT DOCUMENTS

| CN | 104951503 A | 9/2015 |
| CN | 106471501 A | 3/2017 |
| CN | 106649770 A | 5/2017 |
| CN | 108304548 A | 7/2018 |
| WO | 2017161540 A1 | 9/2017 |

* cited by examiner

*Primary Examiner* — Isaac M Woo
(74) *Attorney, Agent, or Firm* — Conley Rose, P.C.

(57) ABSTRACT

A data query method includes: receiving a data query request during a data query, where the data query request specifies data ranges in a plurality of dimensions; obtaining spatial distribution information of multi-dimensional data, where the spatial distribution information records data ranges, in each dimension, of a plurality of subspace objects associated with the multi-dimensional data; determining, from the multi-dimensional data based on the spatial distribution information of the multi-dimensional data, a block that meets the data ranges in the plurality of dimensions specified by the data query request; and searching the determined block for data that meets the data ranges in the plurality of dimensions specified by the data query request.

20 Claims, 19 Drawing Sheets

Data table

| id | name | height | age | salary |
|---|---|---|---|---|
| 1 | david | 1.62 | 18 | 50 |
| 2 | eason | 1.58 | 40 | 100 |
| 3 | kebin | 1.86 | 26 | 300 |
| 4 | cody | 1.59 | 10 | 0 |
| ... | ... | ... | ... | ... |
| 32000 | eva | 1.88 | 25 | 160 |
| 32001 | lisa | 1.50 | 15 | 0 |
| 32002 | eric | 1.92 | 20 | 180 |
| 32003 | jack | 1.68 | 45 | 300 |
| 32004 | kaly | 1.20 | 10 | 0 |
| ... | ... | ... | ... | ... |
| 64000 | ted | 1.64 | 39 | 280 |
| 64001 | mary | 1.66 | 40 | 115 |
| 64002 | henry | 1.86 | 28 | 19 |
| 64003 | sarah | 1.70 | 38 | 36 |
| 64004 | tom | 1.59 | 19 | 6 |
| ... | ... | ... | ... | ... |
| 96000 | jack | 1.76 | 48 | 26 |
| 96001 | rosa | 1.59 | 30 | 5 |
| 96002 | lily | 1.63 | 26 | 22 |
| 96003 | jarry | 1.75 | 25 | 120 |
| 96004 | daisy | 1.90 | 39 | 276 |
| ... | ... | ... | ... | ... |
| 12800 | hebe | 1.82 | 56 | 158 |
| ... | ... | ... | ... | ... |

| id | d1 | d2 | d3 |
|---|---|---|---|
| 1 | 1448 | 8053 | 3425 |
| 2 | 8238 | 3295 | 598 |
| 3 | 3429 | 3434 | 832 |
| 4 | 8582 | 2434 | 824 |
| 5 | 8260 | 2041 | 749 |
| 6 | 2082 | 7792 | 3025 |
| 7 | 4645 | 4686 | 5962 |
| 8 | 4208 | 6409 | 1074 |
| 9 | 196 | 141 | 70 |
| ... | ... | ... | ... |
| 31991 | 5671 | 6704 | 6513 |
| 31992 | 2673 | 6748 | 7638 |
| 31993 | 1006 | 7678 | 2909 |
| 31994 | 1490 | 7375 | 3540 |
| 31995 | 1985 | 5826 | 7661 |
| 31996 | 2284 | 3350 | 8089 |
| 31997 | 8309 | 7598 | 1161 |
| 31998 | 5143 | 4110 | 2204 |
| 31999 | 2432 | 523 | 2074 |
| 32000 | 8964 | 8053 | 1622 |

| d1 | d2 | d3 |
|---|---|---|
| 5 | 29 | 12 |
| 29 | 12 | 2 |
| 12 | 12 | 2 |
| 30 | 8 | 2 |
| 29 | 7 | 2 |
| 7 | 27 | 10 |
| 16 | 16 | 21 |
| 14 | 22 | 3 |
| 0 | 0 | 0 |
| ... | ... | ... |
| 20 | 23 | 23 |
| 9 | 23 | 27 |
| 3 | 27 | 10 |
| 5 | 26 | 12 |
| 7 | 20 | 27 |
| 8 | 11 | 28 |
| 29 | 27 | 4 |
| 18 | 14 | 7 |
| 8 | 1 | 7 |
| 31 | 28 | 5 |

TO FIG. 10B

| Compressed data values and ids of corresponding original data |
|---|
| (0,0,0):[9,256,3150,5460,6310,...,15021,15620,15784] |
| (0,0,1):[152,168,352,789,...,8950,11154,16983,18568] |
| (0,0,2):[] |
| (0,0,3):[65,484,...,9994,10156,18756,21045,21896,21999] |
| (0,0,4):[656,988,4851,5985,6321,...,7912,8014,8016,8851] |
| (0,0,5):[482,543,6891,6976,28620,31410] |
| (0,0,6):[321,531,860,890,1260,...,10653,18944,29610,30580] |
| (0,0,7):[] |
| (0,0,8):[15,19,85,647,856,...,15086,19640,25801,29820] |
| ... |
| (31,31,22):[13,190,246,296,...,1982,2984,5674,18910] |
| (31,31,23):[] |
| (31,31,24):[] |
| (31,31,25):[155,164,590,711,...,19100,19102,20101,21115,29888] |
| (31,31,26):[] |
| (31,31,27):[65,99,101,162,1599,...,9895,10156,25487,26989] |
| (31,31,28):[] |
| (31,31,29):[333,415,6845,8400,...,18225,19064,24836,29000] |
| (31,31,30):[656,988,4851,5985,680891,...,6444,7906,10896,20185] |
| (31,31,31):[34,64,98,156,189,...,10025,10364,10697,20156,23489] |

CONT. FROM FIG. 10A

FIG. 10B

DATA QUERY METHOD AND APPARATUS, COMPUTING DEVICE, AND STORAGE MEDIUM

CROSS-REFERENCE TO RELATED APPLICATIONS

This is a continuation of Int'l Patent App. No. PCT/CN2020/117269 filed on Sep. 24, 2020, which claims priority to Chinese Patent App. No. 201910907480.2 filed on Sep. 24, 2019 and Chinese Patent App. No. 202010247340.X filed on Mar. 31, 2020, all of which are incorporated by reference.

FIELD

This disclosure relates to the field of big data technologies, and in particular, to a data query method and apparatus, a computing device, and a storage medium.

BACKGROUND

With the development of cloud computing and big data technologies, explosive growth of data has been brought about. A data amount of data has been developed from a gigabyte (GB) level, to a terabyte (TB) level, a petabyte (PB) level, an exabyte (EB) level, and the like. Near real-time data analysis has become a more urgent requirement. During data analysis, first, to-be-analyzed data needs to be queried in a large quantity of data.

In a related technology, a process of querying to-be-analyzed data is as follows: When storing a file, a server cuts the file into blocks, determines a maximum value and a minimum value of data of each block in each dimension, and then stores the maximum value and the minimum value of the data of each block in each dimension. When performing a data query, the server matches, by using a data range of to-be-queried data, a maximum value and a minimum value of data in a dimension to which the data belongs, and selects a block to which data that includes the data range belongs. Then the server queries data in the data range from the selected block.

In the related technology, because the server uses only the maximum value and the minimum value of data in each dimension to select data, it is possible that a large quantity of blocks that do not include the to-be-queried data are selected. For example, a data range of data of a block in a d1 dimension is [10, 45], the to-be-queried data is in the d1 dimension, and a range is [27, 38]. According to a manner of the related technology, even though the data of the block in the d1 dimension does not include data within [27, 38], the data is selected. Therefore, a query manner based on the related technology causes relatively low data query efficiency.

SUMMARY

To resolve a problem that data query efficiency is relatively low, this disclosure provides a data query method and apparatus, a computing device, and a storage medium.

According to a first aspect, in a data query method, a data query request is received, where the data query request specifies data ranges in a plurality of dimensions; spatial distribution information of multi-dimensional data is obtained, where the spatial distribution information records data ranges, in each dimension, of a plurality of subspace objects associated with the multi-dimensional data; a block that meets the data ranges in the plurality of dimensions specified by the data query request is determined in the multi-dimensional data based on the spatial distribution information of the multi-dimensional data; and the determined block is searched for data that meets the data ranges in the plurality of dimensions specified by the data query request.

For example, the subspace object is formed by performing spatial clustering on the multi-dimensional data.

In the solution shown, the method may be performed by a data query apparatus, and the data query apparatus may receive a data query request. The data query request specifies data ranges in a plurality of dimensions, that is, to-be-queried data belongs to the plurality of dimensions. The data query apparatus may obtain spatial distribution information of multi-dimensional data, where the spatial distribution information records data ranges, in each dimension, of a plurality of subspace objects associated with the multi-dimensional data. Then, the data query apparatus may determine, from the multi-dimensional data based on the spatial distribution information, a block that meets to-be-queried data ranges in a plurality of dimensions. The data query apparatus may search, by using the to-be-queried data ranges in the plurality of dimensions, the determined block for data indicated by the data ranges in the plurality of dimensions. In this way, for data that is spatially adjacent to each other but relatively scattered on a physical memory, spatial distribution information of multi-dimensional data is constructed by learning spatial distribution information of the data, so that a query can be effectively filtered, thereby reducing ineffective reading and analysis of a large quantity of blocks and increasing a data query speed.

In a possible implementation, determining, from the multi-dimensional data based on the spatial distribution information of the multi-dimensional data, the block that meets the data ranges in the plurality of dimensions specified by the data query request includes: determining, from the plurality of subspace objects based on the spatial distribution information of the multi-dimensional data, one or more subspace objects that meet the data ranges in the plurality of dimensions specified by the data query request; and using a block to which the determined subspace object belongs as a block that meets the data ranges in the plurality of dimensions specified by the data query request.

In the solution shown, the data query apparatus matches a data range of data in each of the plurality of dimensions with the spatial distribution information of the multi-dimensional data, to obtain subspace objects that the data range in each dimension meets. The data query apparatus obtains an intersection set of the subspace objects that the data range in each dimension meets, to obtain subspace objects that meet the data ranges in the plurality of dimensions. The data query apparatus determines data blocks indicated by identifiers of these subspace objects as blocks that meet the data ranges of the multi-dimensional data. In this way, a possibility that a found block does not include to-be-queried data may be reduced as much as possible.

In a possible implementation, when no subspace object that meets the data ranges in the plurality of dimensions specified by the data query request is found in the plurality of subspace objects based on the spatial distribution information of the multi-dimensional data, it is fed back that no data meeting the data query request exists.

In the solution shown, when the data query apparatus finds, in the plurality of subspace objects of the multi-dimensional data, no subspace object that meets the data ranges in the plurality of dimensions, the data query apparatus may feed back that no data meeting the data query request exists to a device sending the data query request, so that the device sending the data query request can know a query result in time.

In a possible implementation, obtaining the spatial distribution information of the multi-dimensional data includes: obtaining spatial distribution information of first-level blocks of the multi-dimensional data, where the spatial distribution information of the first-level blocks records data ranges, in each dimension, of a plurality of subspace objects associated with data of the first-level blocks; and obtaining spatial distribution information of second-level blocks of a target block, where the spatial distribution information of the second-level blocks records data ranges, in each dimension, of a plurality of subspace objects associated with data of the second-level blocks. Determining, from the multi-dimensional data based on the spatial distribution information, the block that meets the data ranges in the plurality of dimensions specified by the data query request includes: determining, from the first-level blocks based on the spatial distribution information of the first-level blocks, a target block that meets the data ranges in the plurality of dimensions specified by the data query request; and determining, from the target block based on the spatial distribution information of the second-level blocks, a second-level block that meets the data ranges in the plurality of dimensions specified by the data query request.

In the solution shown, the multi-dimensional data may be divided into a plurality of levels. For example, the multi-dimensional data is divided into a first-level and a second-level. Correspondingly, the first-level may include a plurality of first-level blocks, and the second-level may include a plurality of second-level blocks. A second-level block is obtained by dividing a first-level block, and a plurality of second-level blocks form one first-level block. The data query apparatus may obtain the spatial distribution information of the first-level blocks and the spatial distribution information of the second-level blocks of the multi-dimensional data. The spatial distribution information of the first-level blocks may record the data ranges, in each dimension, of the plurality of subspace objects associated with the data of the first-level blocks. The spatial distribution information of the second-level blocks may record the data ranges, in each dimension, of the plurality of subspace objects associated with the data of the second-level blocks.

The data query apparatus may first determine, from the first-level blocks based on the spatial distribution information of the first-level blocks, one or more subspace objects that meet the data ranges in the plurality of dimensions. The data query apparatus determines one or more blocks corresponding to one or more identifiers of the one or more subspace objects as one or more target blocks. The data query apparatus then determines second-level blocks included in the target block, determines, from these second-level blocks by using spatial distribution information of these second-level blocks, one or more subspace objects that meet the data ranges in the plurality of dimensions, and determines one or more second-level blocks corresponding to one or more identifiers of the one or more subspace objects as one or more second-level blocks that meet the data ranges in the plurality of dimensions specified by the data query request. In this way, first-level blocks are first filtered to filter out a first-level block that does not include to-be-queried data within the data ranges of the multi-dimensional data; and second-level blocks in a remaining first-level block are filtered, so that a data query speed can be increased.

In a possible implementation, the method further includes: determining the plurality of subspace objects of the multi-dimensional data based on a distribution feature and a constraint condition of the multi-dimensional data in a multi-dimensional space.

In the solution shown, the constraint condition may include one or more of: a quantity of subspace objects, a data amount of each subspace object, increment information of a subspace object, or calculation performance. The quantity of subspace objects refers to a maximum quantity and a minimum quantity of subspace objects. The data amount of a subspace object refers to a maximum data amount and a minimum data amount included in each subspace object. The increment information of a subspace object refers to a maximum increment of a volume of the subspace object after data is added. The calculation performance refers to a maximum time required for calculating the spatial distribution information. The distribution feature refers to a data interval and the like.

The data query apparatus first divides the multi-dimensional data into a plurality of blocks (the plurality of blocks may include only one level of blocks, or may include a plurality of levels of blocks), and the data query apparatus determines a plurality of subspace objects of each block of the multi-dimensional data based on the distribution feature and the constraint condition of the multi-dimensional data in the multi-dimensional space, so as to obtain the spatial distribution information of the multi-dimensional data. Each subspace object has a corresponding data range in each dimension.

In a possible implementation, determining the plurality of subspace objects of the multi-dimensional data based on the distribution feature and the constraint condition of the multi-dimensional data in the multi-dimensional space includes: performing dimension reduction on the multi-dimensional data to obtain dimension-reduced data; and determining the plurality of subspace objects based on a distribution feature and a constraint condition of the dimension-reduced data in a low-dimensional space.

Dimension reduction is dimensionality reduction. For example, the multi-dimensional data is three-dimensional data, the dimension-reduced data is one-dimensional data, and the low-dimensional space is a one-dimensional space.

In the solution shown, for any block of the multi-dimensional data, the data query apparatus may obtain dimension-reduced data by performing coding for dimension reduction on multi-dimensional data included in the block. The data query apparatus may then determine a plurality of subspace objects corresponding to the block by using a distribution feature and a constraint condition of the dimension-reduced data in the low-dimensional space. The data query apparatus then merges subspace objects of all blocks, that is, obtains the plurality of subspace objects of the multi-dimensional data. In this way, dimension reduction is performed on the multi-dimensional data. Compared with clustering on the multi-dimensional data, clustering on the dimension-reduced data reduces a calculation amount, improves a determining speed of clustering, and further increases a determining speed of determining the subspace object.

In a possible implementation, the determining the plurality of subspace objects of the multi-dimensional data based on a distribution feature and a constraint condition of the multi-dimensional data in a multi-dimensional space includes: performing volume increment clustering on the multi-dimensional data to obtain the plurality of subspace objects.

In this embodiment, for any block in the multi-dimensional data, the data query apparatus groups a plurality of pieces of data in the block into a cluster (which may be referred to as a first cluster), and then adds data to the first cluster. If a difference between a volume of the first cluster after the data is added and a volume of the first cluster without adding the data is less than a specific value, the data is added to the first cluster. If the difference between the volume of the first cluster after the data is added and the volume of the first cluster without adding the data is greater than or equal to the value, establishment of the first cluster is completed. The data query apparatus creates a new cluster (which may be referred to as a second cluster) and performs the same processing as that performed on the first cluster until all data in the multi-dimensional data is traversed, so as to obtain a final cluster. The data query apparatus uses each cluster as one subspace object. Then, a data range of each subspace object in each dimension is determined, that is, a subspace object corresponding to the block is obtained.

In a possible implementation, the determining the plurality of subspace objects of the multi-dimensional data based on a distribution feature and a constraint condition of the multi-dimensional data in a multi-dimensional space includes: performing subspace division on the multi-dimensional data, and obtaining the plurality of subspace objects based on a distribution feature and a constraint condition of a subspace obtained through division.

In the solution shown, when a data range of data in each dimension in the multi-dimensional data is relatively large, there is a wide value range or a large floating-point precision of the data, resulting in a large data calculation amount or high calculation complexity during clustering. The data query apparatus equally divides the data range of data in each dimension of the block into N intervals (N may be preset by a user). Then, for data in each dimension of any block of the multi-dimensional data, the data query apparatus maps all data in the first interval in the dimension to 0; the data query apparatus maps all data in the second interval in the dimension to 1; and the data query apparatus maps all data in an $i^{th}$ interval in the dimension to i−1, so as to successively map all data in the dimension to 0 to N−1. In a same manner, the data query apparatus may map data in each dimension to 0 to N−1.

Then, the data query apparatus constitutes a coordinate of a data point by using N values obtained after data in each dimension is mapped, that is, a subspace is obtained. The data query apparatus merges subspaces, and obtains a maximum value and a minimum value of data of a merged subspace in each dimension, and each merged subspace is a subspace object. For each subspace object, a maximum value and a minimum value of the subspace object in data in each dimension form a data range of the subspace object in each dimension. In this way, a subspace object of each block of the multi-dimensional data can be determined. In this way, after dimension compression is performed on the data to obtain a subspace, a required data calculation amount is reduced, so that filtering performance of a data query can be improved. In addition, dimension compression and coding can be performed to obtain a subspace, provided that data of a block in each dimension is sortable, so that an application range is relatively wide.

In a possible implementation, the data ranges of the plurality of subspace objects in each dimension form indexes of the plurality of subspace objects.

According to a second aspect, a data query apparatus includes one or more modules, and the one or more modules are configured to implement the data query method provided in the first aspect or the possible implementations of the first aspect.

According to a third aspect, a computing device for querying data includes a processor and a memory, and the processor executes instructions stored in the memory, so that the computing device implements the data query method provided in the first aspect or the possible implementations of the first aspect.

According to a fourth aspect, a computer-readable storage medium stores instructions, where the instructions instruct a computing device to perform the data query method provided in the first aspect or the possible implementations of the first aspect.

According to a fifth aspect, a computer program product includes instructions, where the instructions instruct a computing device to perform the data query method provided in the first aspect or the possible implementations of the first aspect.

BRIEF DESCRIPTION OF THE DRAWINGS

FIG. 1A and FIG. 1B are a schematic diagram of a data query according to an example embodiment.

FIG. 10A and FIG. 10B are a schematic diagram of mapped data according to an example embodiment.

DETAILED DESCRIPTION

To make the objectives, technical solutions, and advantages clearer, the embodiments are described below in further detail with reference to accompanying drawings.

For ease of understanding, the following first describes concepts of related terms.

Data filtering means that a block that does not include to-be-queried data is filtered out in a specific manner in a data query, and no further query is performed in the block.

Through data filtering, the block that does not include the to-be-queried data can be filtered out to some extent. The to-be-queried data is queried only in a block that may include the to-be-queried data, so that data query efficiency can be improved.

Block division refers to breaking down a data table in a database into smaller, more manageable parts according to some rules. Each part may be one block or one file block. Herein, it should be noted that each data block may have an equal data amount (this is because the data block is obtained by dividing a file block usually based on an equal size). File blocks may have unequal data amounts (this is because data of a file imported at a specific time does not meet a data amount requirement of one file block, the file is not divided, and the data of this file is one file block). Certainly, block division may be in another dividing mode, and this is not limited in this embodiment.

Single-dimensional data includes data in only one dimension. For example, for a data table that includes only an age dimension, data included in the data table is single-dimensional data.

Multi-dimensional data, compared with the single-dimensional data, refers to data including a plurality of dimensions. For example, for a data table that includes age, salary, and name dimensions, data included in the data table is multi-dimensional data.

Figure 1B:
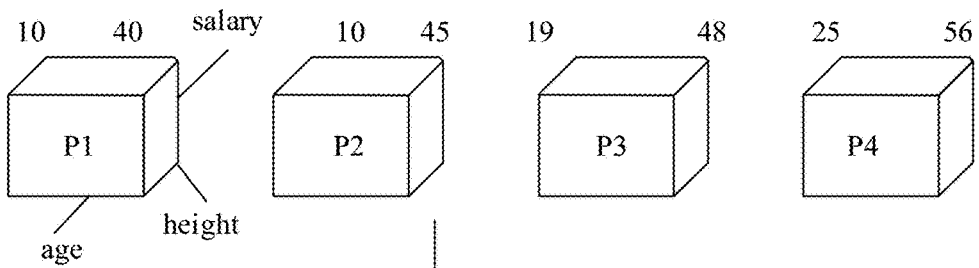

In a big data scenario, a data amount of indexes built for each piece of data is too large, the indexes cannot be all stored in a memory, and some of the indexes also need to be stored into a disk. Therefore, a big data analysis system with a distributed architecture tends to store the data and the indexes into the disk for block division processing. During block division processing, if a data amount of a file is large, a device performing data storage divides the file into file blocks based on a partition column, and then divides the file blocks into data blocks based on a primary key column. The device performing data storage then determines a data range of data in each dimension of each data block, and a data range of data in any dimension of any data block is a range consisting of a maximum value and a minimum value of the data in the dimension. In a related technology, as shown in FIG. 1A and FIG. 1B, a data table has five attribute columns (that is, data in four dimensions, where an identifier (id) is not used as a dimension of the data), namely, id, name, height, age, and salary. The device performing data storage divides the data table into blocks based on ids, that is, every 32000 pieces of data are grouped into one data block. The data table is divided into four data blocks, namely, block 1, block 2, block 3, and block 4. Then, a minimum value and maximum value (MINMAX) index of data in each dimension of each data block is constructed based on statistical information at a data block level, for example, a MINMAX index of the age column in block 1 is [10, 40], a MINMAX index of the age column in block 2 is [10, 34], a MINMAX index of the age column in block 3 is [40, 50], and a MINMAX index of the age column in block 4 is [15, 37]. Thus, three data blocks, namely, block 1, block 2, and block 4, are hit by querying data of height≥1.62 and height≤1.64, age≥27 and age≤38, and salary≥200 and salary≤300 in the data table, and subsequently, to-be-queried data is queried in the three data blocks, namely, block 1, block 2, and block 4.

In the related technology, although block 1, block 2, and block 4 are all selected through filtering, because filtering is performed only based on the MINMAX index, the following situation occurs: A data range of data in the age dimension of block 1 is [10, 40], in which data of [27, 38] does not exist. It can be learned that the data in the age dimension of block 1 will be selected through filtering even if the data of [27, 38] is not included in the data in the age dimension of block 1. As a result, a large quantity of data blocks are scanned ineffectively, and data query efficiency is relatively low. Therefore, it is necessary to provide an efficient data query method.

A data query method may be performed by a data query apparatus. The data query apparatus may be a hardware apparatus, for example, a computing device such as a server or a terminal, or may be a software apparatus, for example, a set of software programs running on the hardware apparatus.

Figure 2:
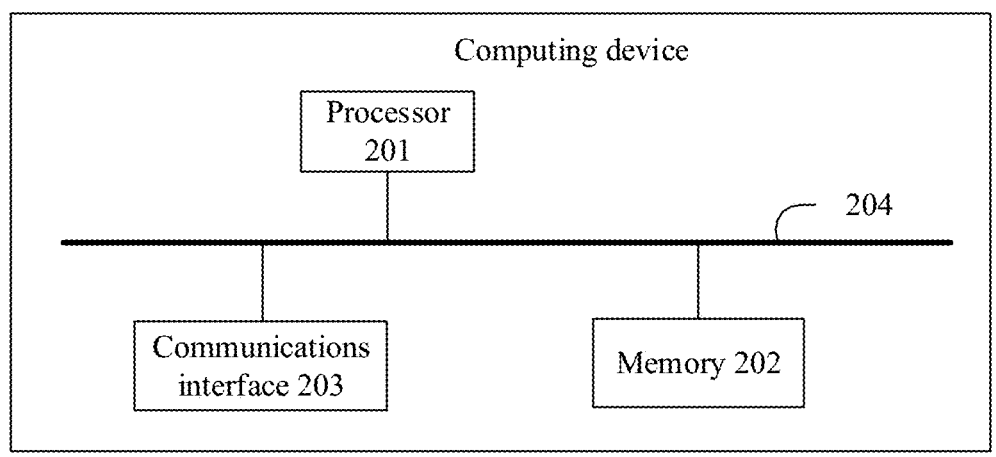
FIG. 2 is a schematic diagram of a structure of a computing device according to an example embodiment.

The data query apparatus is a computing device, and FIG. 2 schematically provides one possible architectural diagram of the computing device. The computing device may include a processor 201, a memory 202, a communications interface 203, and a bus 204. In the computing device, there may be one or more processors 201. FIG. 2 shows only one processor 201. Optionally, the processor 201 may be a central processing unit (CPU). If the computing device includes a plurality of processors 201, the plurality of processors 201 may be of a same type or different types. Optionally, the plurality of processors of the computing device may be integrated into a multi-core processor.

The memory 202 stores computer instructions and data, and the memory 202 may store computer instructions and data required to implement the data query method. For example, the memory 202 stores instructions used for implementing steps performed by a receiving module in the data query method. For another example, the memory 202 stores instructions used for steps performed by a determining module in the data query method. The memory 202 may be any one or any combination of the following storage media: a non-volatile memory (for example, a read-only memory (ROM), a solid-state drive (SSD), a hard disk drive (HDD), an optical disc) and a volatile memory.

The communications interface 203 may be any one or any combination of the following components with a network access function: a network interface (for example, an Ethernet interface) and a wireless network interface card.

The communications interface 203 is configured to perform data communication between the computing device and another computing device or a terminal.

The bus 204 is also shown in FIG. 2, and the bus 204 may connect the processor 201 to the memory 202 and the communications interface 203. In this way, through the bus 204, the processor 201 may access the memory 202, and may further exchange data with the another computing device or the terminal through the communications interface 203.

The computing device executes the computer instructions in the memory 202, and the computing device is used to implement the data query method. For example, the computing device is caused to perform the steps performed by the receiving module in the data query method described above. For another example, the computing device is caused to perform the steps performed by the determining module and a searching module in the data query method described above.

Figure 3:
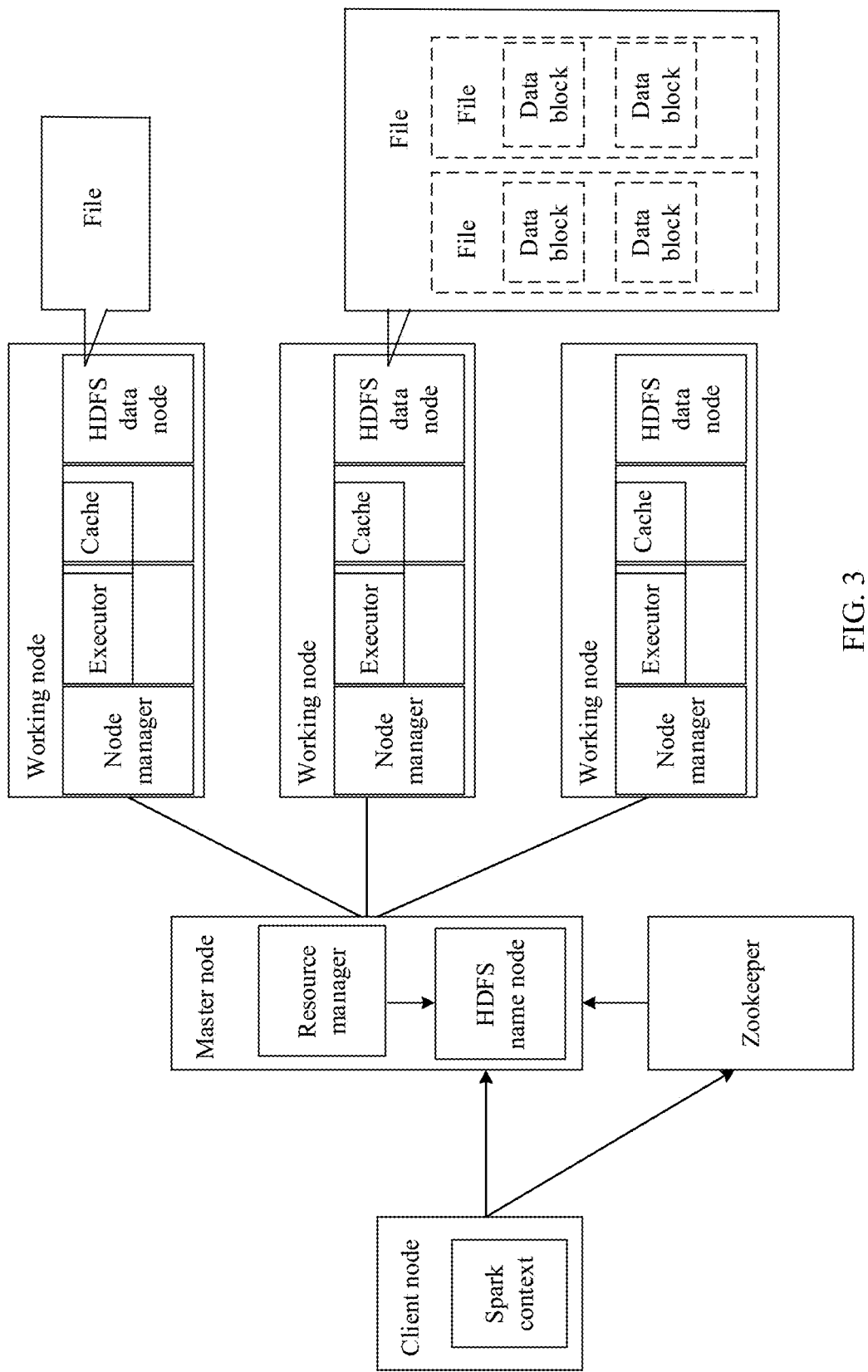
FIG. 3 is a schematic diagram of an application scenario according to an example embodiment.

The data query method may be applied to, but is not limited to, a scenario including yet another resource negotiator (YARN), Spark, and a Hadoop Distributed File System (HDFS) (a fast and universal computing engine designed by Spark for large-scale data processing). As shown in FIG. 3, a deployment manner may be as follows:

A client node connects to a master node and a zookeeper, the Yarn is deployed on the master node, and the master node connects to a Spark cluster and the zookeeper. A Spark context is deployed on the client node (for interacting with a program and the Spark cluster). A Yarn mode has a master/slave structure. In an entire resource management framework, a resource manager of the YARN is the master node, and a node manager of the YARN is a slave node. The resource manager is responsible for unified management and scheduling of resources on each node manager. There are a plurality of distributed working nodes in the Spark cluster, and each working node has the node manager of the YARN, a Spark executor, a cache, and an HDFS (Data Node). The HDFS data node contains a plurality of files, each file consists of a plurality of data blocks (Blocklet), and much necessary information, such as a pattern, an offset, and an index, is contained at the header and trailer of the file.

Figure 4A:
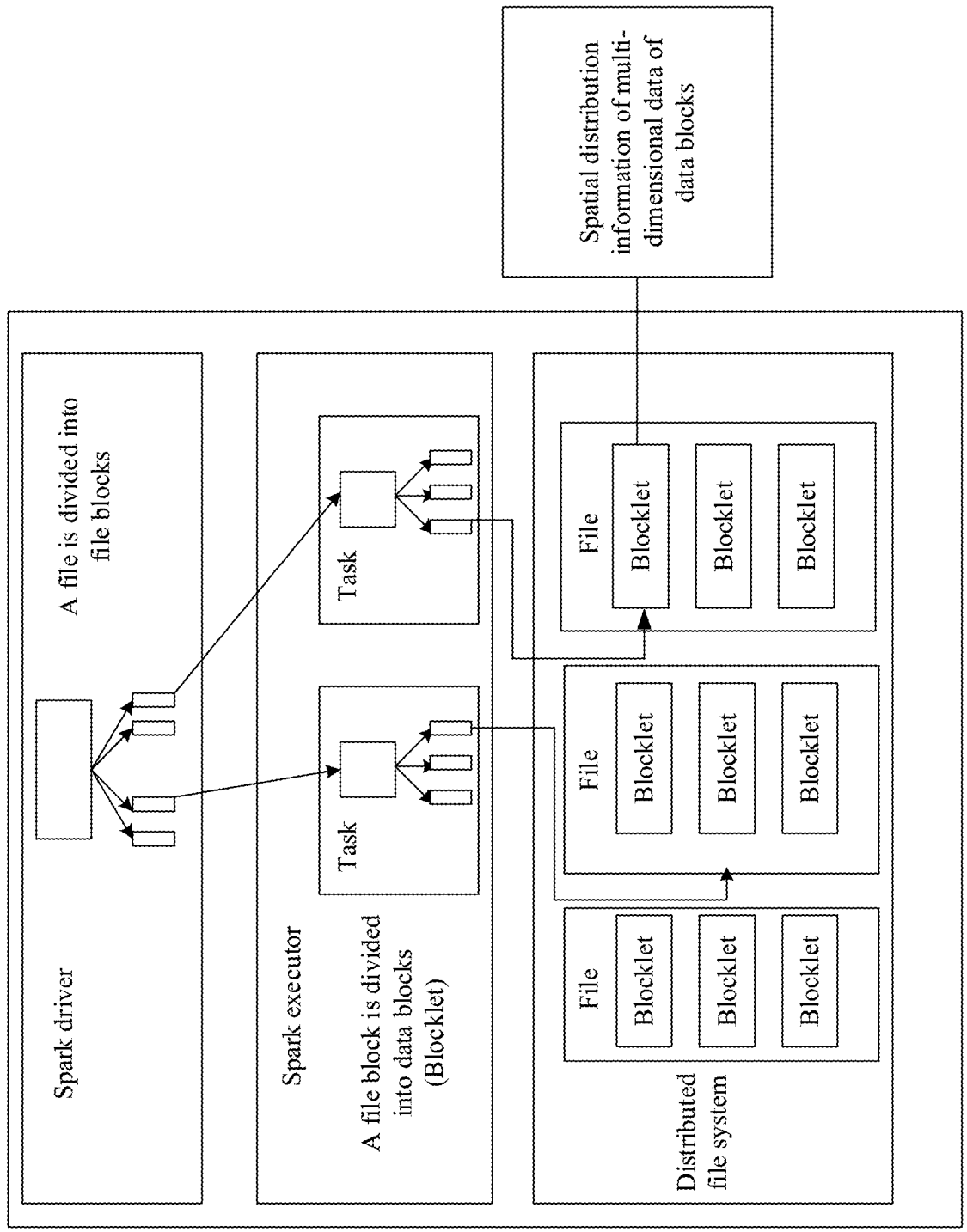
FIG. 4A and FIG. 4B are a schematic diagram of an application scenario according to an example embodiment.
Figure 4B:
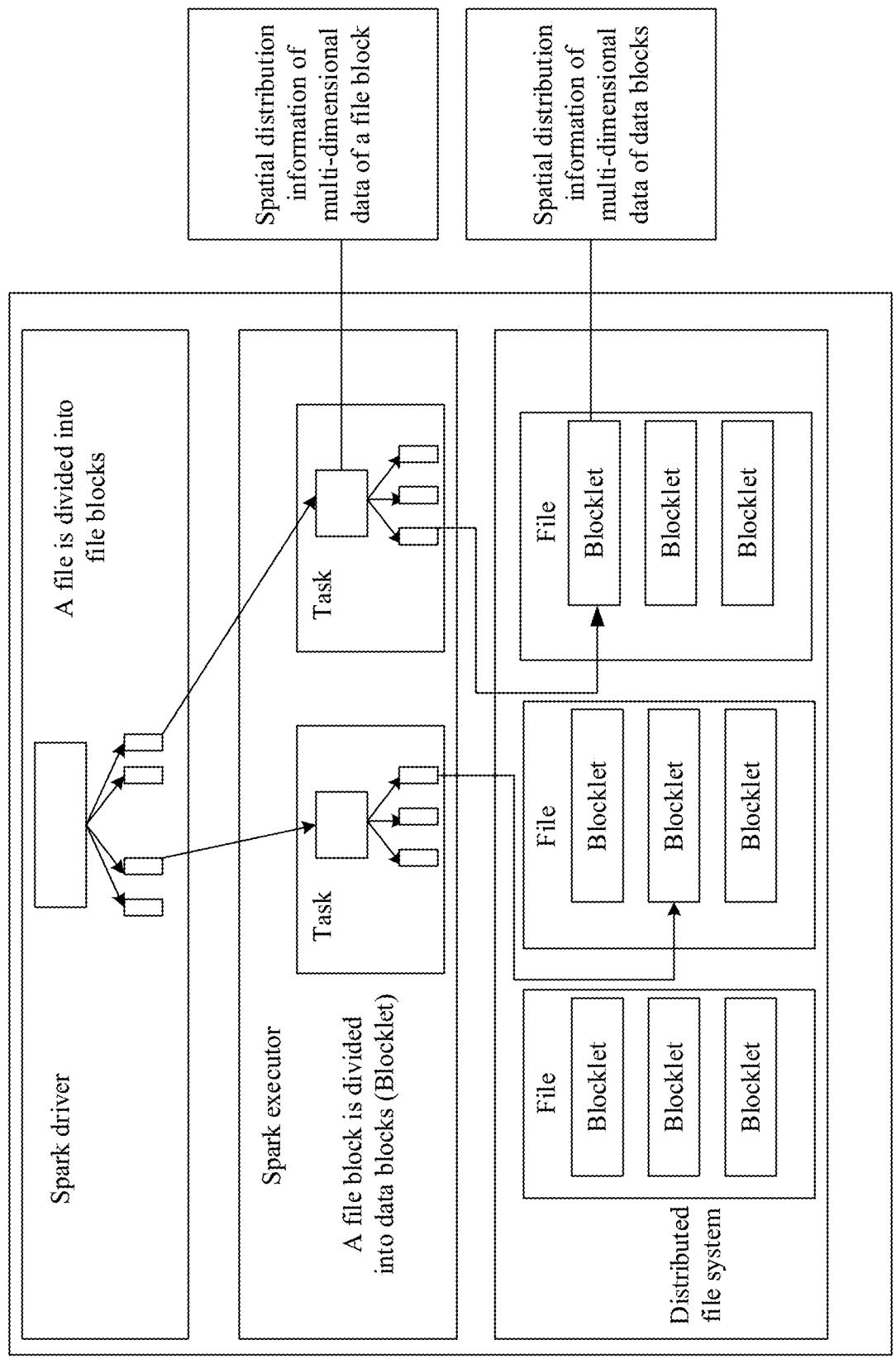

A data query may be performed in manners shown in FIG. 4A and FIG. 4B. In FIG. 4A and FIG. 4B, a Spark driver divides multi-dimensional data into first-level blocks (for example, file blocks), and a Spark executor control task divides a first-level block into second-level blocks (for example, data blocks), where the second-level blocks are stored based on a distributed file system. A plurality of second-level blocks form one first-level block.

In a data query process shown in FIG. 4A, filtering of the multi-dimensional data is implemented within the second-level blocks (for example, the data blocks), that is, the filtering of the multi-dimensional data is implemented at a second-level.

In a data query process shown in FIG. 4B, the multi-dimensional data can be filtered only within the first-level blocks (for example, the file blocks), that is, the filtering of the multi-dimensional data is implemented at a first-level.

In a possible implementation, in the data query process shown in FIG. 4B, a data query apparatus may also first filter the multi-dimensional data at the first-level and then filter the multi-dimensional data at the second-level.

Figure 5:
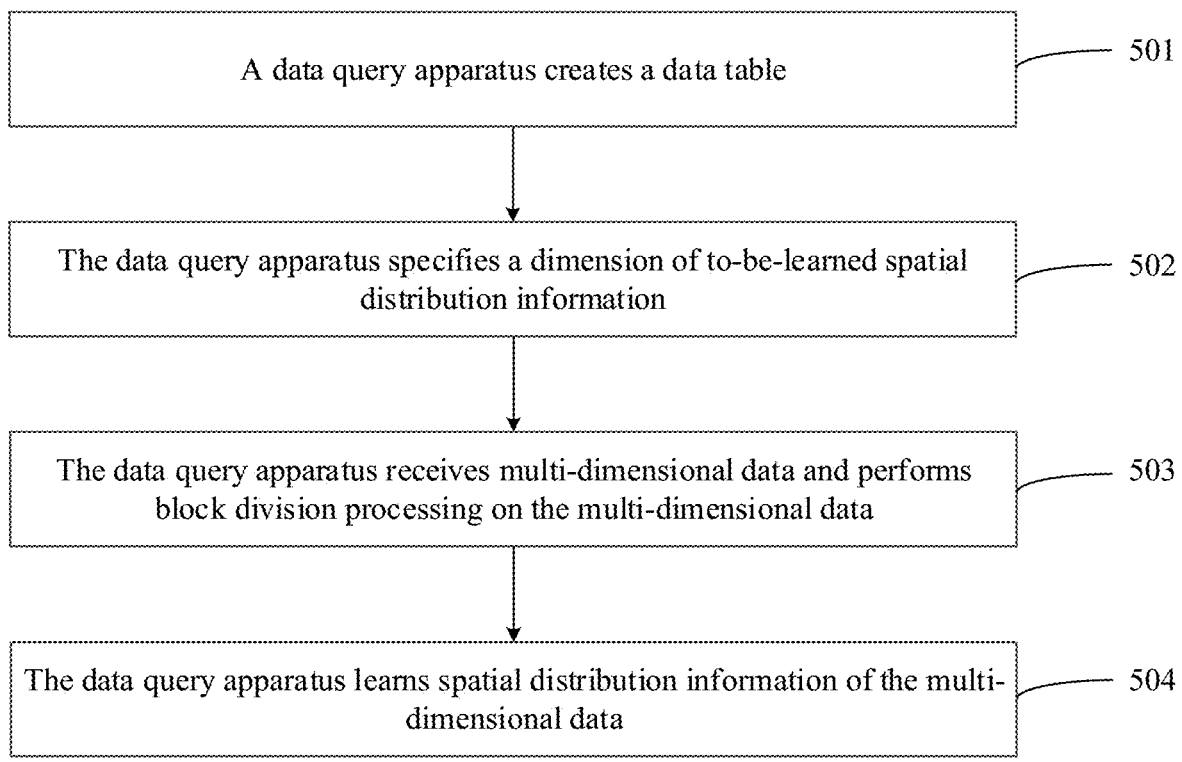
FIG. 5 is a schematic flowchart of a method for determining spatial distribution information according to an example embodiment.

As shown in FIG. 5, before a data query, multi-dimensional data is imported and spatial distribution information of the multi-dimensional data is learned (because the multi-dimensional data is divided into blocks, spatial distribution information of the blocks is learned). Method steps may be as follows:

Step 501: A data query apparatus creates a data table.

In this embodiment, for the multi-dimensional data (the multi-dimensional data is one data table or a plurality of data tables), when a user (who may be an operation and maintenance person) wants to store the multi-dimensional data, the user may input a creation request of the data table corresponding to the multi-dimensional data into the data query apparatus through an operation interface or by compiling a structured query language (SQL) statement. The data query apparatus receives the creation request of the data table, where the creation request carries information about the to-be-created data table. Specifically, the information may be an included attribute column, an identifier of a sorting column, and the like. The data query apparatus can create the data table corresponding to the creation request.

For example, the multi-dimensional data has N pieces of data, and dimensions are name, age, height, and salary. The data query apparatus creates a data table t_salary (where the multi-dimensional data is one data table) containing five attribute columns: id, name, age, height, and salary, where id is a sorting column for identifying different data, and non-sorting columns are name, age, height, and salary. The following statements may be used:

```
CREATE TABLE   t_salary (
   id                           string,
   name                         string,
   age                          int,
   height                       double,
   salary                       int)
STORED BY  'name'
TBLPROPERTIES ('SORT_COLUMNS'='id')
``` where "CREATE TABLE t_salary (id string, name string, age int, height double, salary int)" means creating the data table t_salary, where id and name are expressed in a string format, age and salary are expressed in an integer format, and height is expressed in a double-precision floating-point format. "STORED BY 'name'" means storage by name, and "TBLPROPERTIES ('SORT_COLUMNS'='id')" means using "id" as the sorting column.

Step 502: The data query apparatus specifies a dimension of to-be-learned spatial distribution information.

In this embodiment, because the spatial distribution information of the multi-dimensional data is first learned before the data query, the data query apparatus needs to specify a specific dimension of the to-be-learned multi-dimensional data. Specifically, for the data table t_salary described above, the data query apparatus may specify, by using the following statements, that spatial distribution information of the non-sorting columns, age, height, and salary of the data table t_salary is to be learned. The statements may be as follows:

```
CREATE DATAMAP t_salary_filter
ON TABLE t_salary
   USING 'MultiDimensionalFilter'
   DMPROPERTIES ('MDF_COLUMNS' = 'age, height, salary')
``` where "CREATE DATAMAP t_salary_filter ON TABLE t_salary" means creating a specific data map (DATAMAP) in the data table t_salary. "USING 'MultiDimensionalFilter'" further indicates that this DATAMAP is used for multi-dimensional data filtering, and "DMPROPERTIES ('MDF_COLUMNS'='age, height, salary')" further indicates that specific dimensions involved in the multi-dimensional data filtering are age, height, and salary.

Step 503: The data query apparatus receives the multi-dimensional data and performs block division processing on the multi-dimensional data.

In this embodiment, when a user (who may be an operation and maintenance person) wants to import the multi-dimensional data into the data table, the user may input a data import command to the data query apparatus (the user may input the data import command through an interface or input the data import command by using an SQL statement). After receiving the data import command, the data query apparatus imports the multi-dimensional data into the data table created in step 501. The data query apparatus determines whether a data amount of the multi-dimensional data is greater than a preset threshold. If the data amount of the multi-dimensional data is greater than the preset threshold, the data query apparatus may divide the data table into blocks based on a partition column. In this way, the multi-dimensional data is finally divided into a plurality of blocks.

Figure 6:
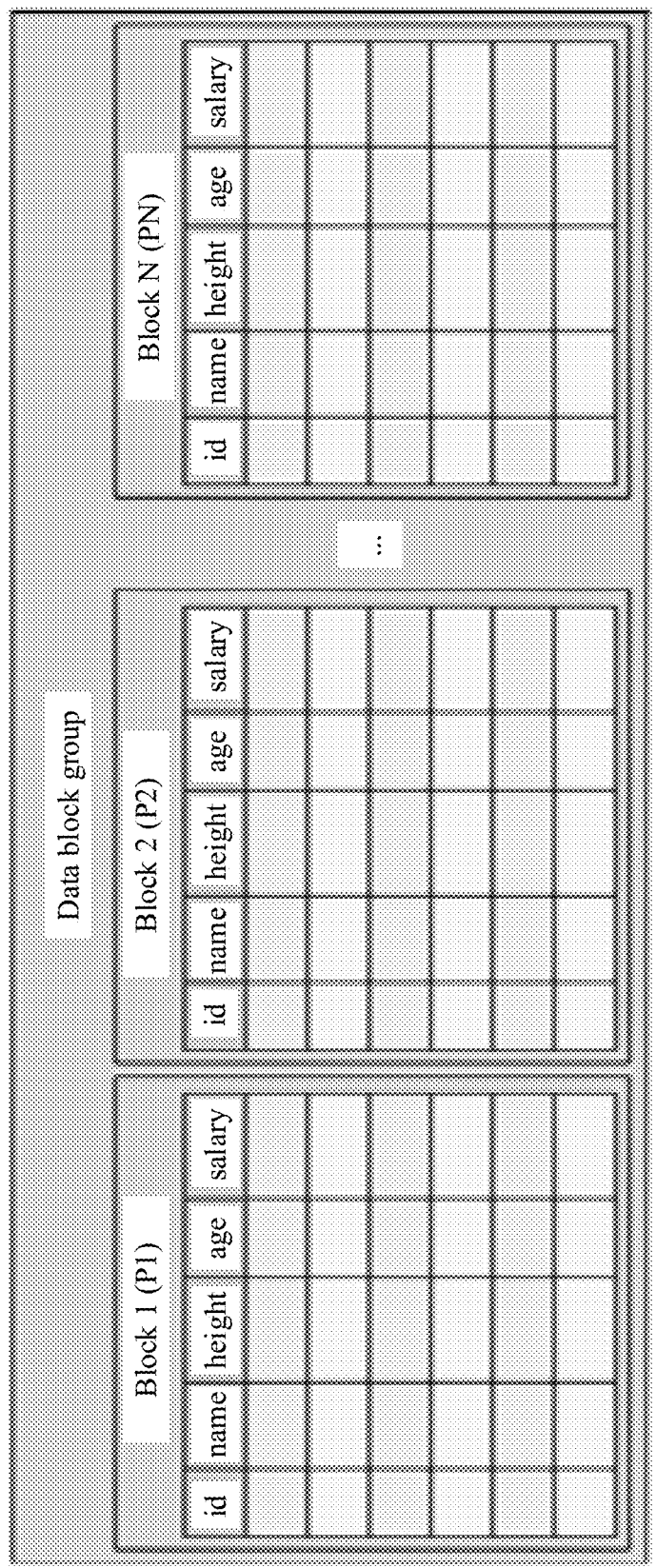
FIG. 6 is a schematic diagram of a data block obtained through division according to an example embodiment.

In a possible implementation, the data query apparatus performs hierarchical division on the multi-dimensional data as follows: After receiving the data import command, the data query apparatus imports the multi-dimensional data into the data table created in step 501. The data query apparatus determines whether the data amount of the multi-dimensional data is greater than the preset threshold. If the data amount of the multi-dimensional data is greater than the preset threshold, the data query apparatus may divide the data table into first-level blocks based on the partition column. The data query apparatus may then divide each first-level block into second-level blocks based on a primary key column. For example, as shown in FIG. 6, for the foregoing data table t_salary, the partition column is "city". The data query apparatus divides a file according to "city", to obtain first-level blocks. The primary key column is id. The data query apparatus successively divides 1-32000 of the id column into a second-level block, and divides 32001-64000 of the id column into a second-level block, and the like. In this way, the data table containing the multi-dimensional data is finally divided into N second-level blocks (block 1 to block N).

It should be noted herein that when the multi-dimensional data is divided into blocks, the multi-dimensional data may be divided into one level of blocks, or the multi-dimensional data may be divided into a plurality of levels of blocks based on multi-level division (for example, the first-level block is a file block, and the second-level block is a data block). This is not limited in this embodiment.

Step 504: The data query apparatus learns the spatial distribution information of the multi-dimensional data.

In this embodiment, the data query apparatus learns the spatial distribution information of the multi-dimensional data. Specifically, a plurality of subspace objects of each block of the multi-dimensional data are determined based on a distribution feature and a constraint condition of the multi-dimensional data in a multi-dimensional space, so as to obtain the spatial distribution information of the multi-dimensional data. The constraint condition may include one or more of: a quantity of subspace objects, a data amount of each subspace object, increment information of a subspace object, or calculation performance. The quantity of subspace objects refers to a maximum quantity and a minimum quantity of subspace objects. The data amount of a subspace object refers to a maximum data amount and a minimum data amount included in each subspace object. The increment information of a subspace object refers to a maximum increment of a volume of the subspace object after a piece of data is added. The calculation performance refers to a maximum time required for calculating the spatial distribution information.

Figure 7:
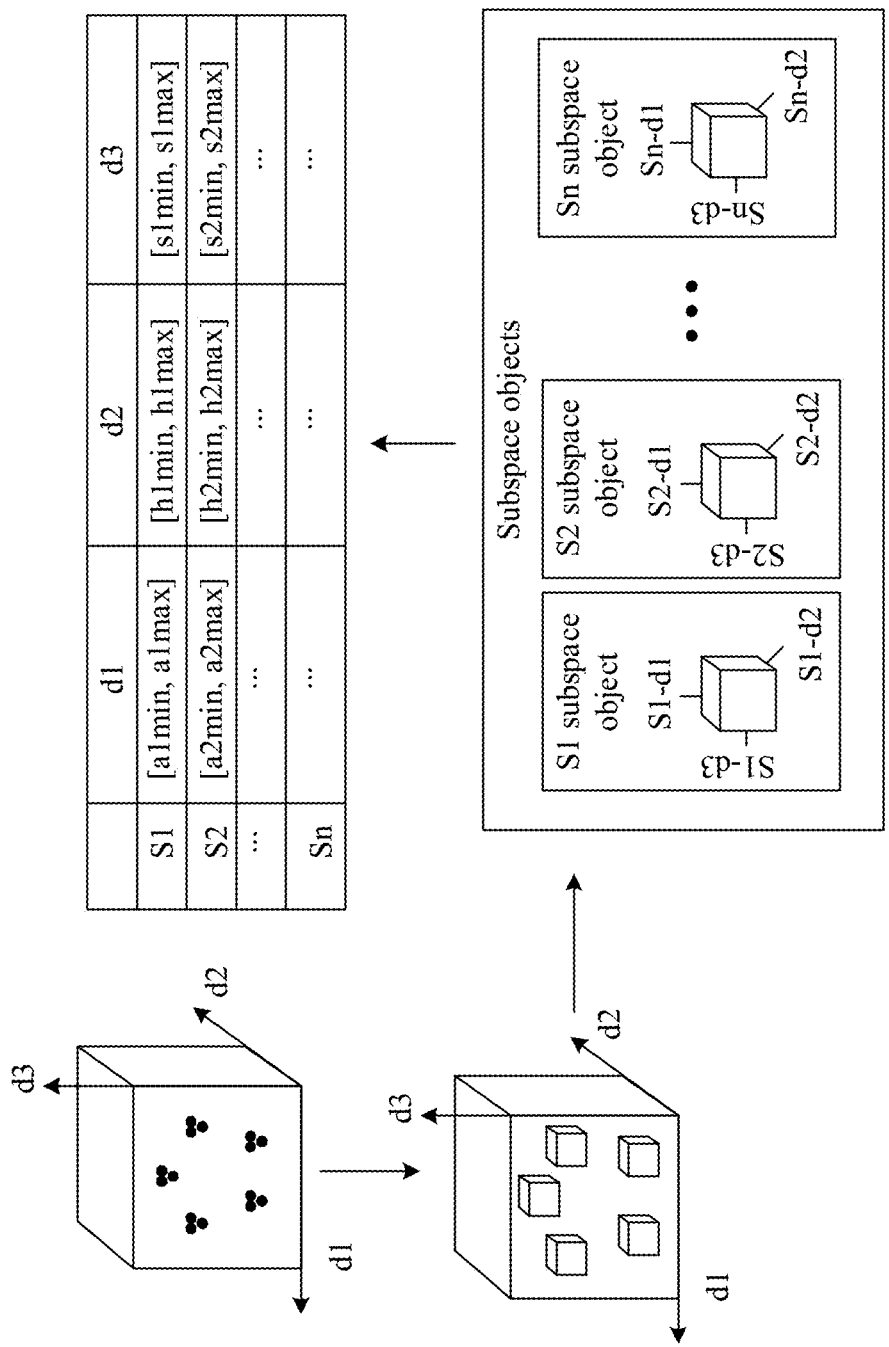
FIG. 7 is a schematic diagram of a subspace object according to an example embodiment.

For example, as shown in FIG. 7, when the dimensions of the multi-dimensional data are age (d1 dimension), height (d2 dimension), and salary (d3 dimension), for one block in the multi-dimensional data, a block indicates that spatially adjacent data in the block is grouped into a same cluster, and finally n clusters are generated. Each cluster may be represented as one subspace object, that is, an S1 subspace object to an Sn subspace object (which may be referred to as a multi-dimensional subspace object group), so that a plurality of subspace objects corresponding to one block can be obtained. Data ranges of each subspace object of all blocks in each dimension form the spatial distribution information of the multi-dimensional data. Herein, the data range may be represented by an interval from a minimum value to a maximum value. For example, for the S1 subspace object, a data range of the d1 dimension is [a1min, a1max], where a1min refers to a minimum value of data in the d1 dimension in the S1 subspace object, and a1max refers to a maximum value of the data in the d1 dimension in the S1 subspace object.

In step 504, in this embodiment, the spatial distribution information of the multi-dimensional data may be learned in the following three manners, but not limited to:

Manner 1: The data query apparatus performs dimension reduction on the multi-dimensional data to obtain dimension-reduced data; and determines the plurality of subspace objects based on a distribution feature and a constraint condition of the dimension-reduced data in a low-dimensional space.

Dimension reduction is dimensionality reduction. For example, the multi-dimensional data is three-dimensional data, the dimension-reduced data is one-dimensional data, and the low-dimensional space is a one-dimensional space.

In this embodiment, for any block of the multi-dimensional data, the data query apparatus may obtain the dimension-reduced data by performing coding for dimension reduction on the multi-dimensional data included in the block. The data query apparatus may then determine a plurality of subspace objects corresponding to the block by using a distribution feature and a constraint condition of the dimension-reduced data in the low-dimensional space. The data query apparatus then merges subspace objects of all blocks of the multi-dimensional data, that is, obtain the plurality of subspace objects of the multi-dimensional data.

Figure 8:
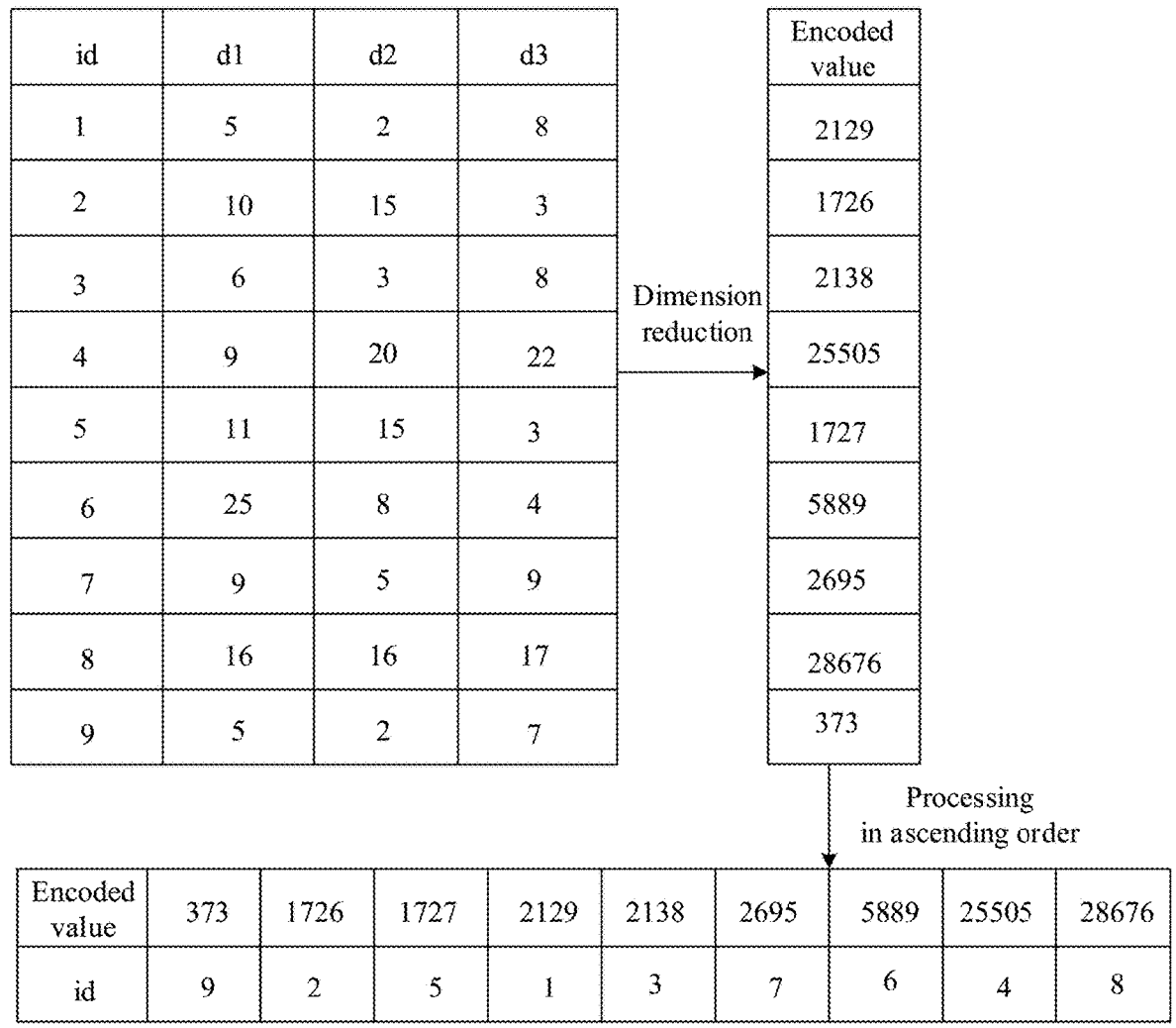
FIG. 8 is a schematic diagram of dimension reduction according to an example embodiment.

Specifically, the data query apparatus arranges the dimension-reduced data in ascending order. It is approximately considered that original data corresponding to the dimension-reduced data with values close to each other is also spatially adjacent. For example, as shown in FIG. 8, a specific block includes three-dimensional data in a d1 dimension, a d2 dimension, and a d3 dimension, and the data query apparatus performs coding for dimension reduction on the three-dimensional data to obtain one-dimensional data. As shown in FIG. 8, the one-dimensional data may be referred to as an encoded value and may be arranged in ascending order.

The data query apparatus may then merge data of adjacent encoded values, and calculate a volume of a polyhedron formed by the merged data, so that a quantity of generated clusters, a volume increment of a cluster, and the like meet the constraint condition. Specific processing is as follows: The data query apparatus constitutes a first cluster by using data of a smallest encoded value and data of an adjacent encoded value, and calculates maximum values and minimum values, in each dimension, of the data corresponding to the two encoded values in the first cluster. The data query apparatus then calculates, based on the calculated maximum values and minimum values, a first volume of a polyhedron formed by the data corresponding to the two encoded values. The data query apparatus then adds data corresponding to an encoded value closest to the two encoded values to the first cluster, and determines a second volume of a polyhedron formed by the data corresponding to the three encoded values. The data query apparatus calculates a difference between the second volume and the first volume, and if the difference is less than or equal to a first preset threshold, the data query apparatus adds the encoded value corresponding to the data newly added to the first cluster to the first cluster as well, and continues the process of adding the closest adjacent encoded value to the first cluster. If the difference is greater than the first preset threshold, an encoded value closest to the two encoded values in the first cluster and a subsequent encoded value constitute a cluster instead of being added to the first cluster. In this case, the first cluster is constructed, and the first cluster is a subspace object. The manner of constructing a cluster by using the encoded value closest to the two encoded values in the first cluster is the same as that of constructing the first cluster, and details are not described herein. In addition, it should be noted that the manner of constructing a cluster is only one possible implementation, and certainly, another manner may be adopted. For example, the data query apparatus may also consider determining a maximum time of the subspace object, so that a time for determining the subspace object cannot exceed the maximum time. When the data query apparatus constructs a subspace object, a data amount of the subspace object cannot be smaller than a minimum data amount of the subspace object, or the like. When the data query apparatus constructs a subspace object, a time length for determining the subspace object cannot exceed a specific value, or the like.

After the cluster is constructed, a maximum value and a minimum value of data in each dimension of each cluster are a data range of the data in each dimension of the cluster, and a data range of data in each dimension of the subspace object is obtained. Thus, it can be determined that one block includes a plurality of subspace objects, and the block correspondingly has a data range indicated by a maximum value and a minimum value of data in each dimension of each subspace object.

It should be noted herein that, in manner 1, coding for dimension reduction may be Morton coding, or certainly, may be another coding manner for dimension reduction. This is not limited in this embodiment. In addition, in manner 1, because only one-dimensional data is left after dimension reduction is performed on the multi-dimensional data, compared with clustering of the multi-dimensional data, clustering of the one-dimensional data reduces a calculation amount, and increases a determining speed of clustering, that is, increases a determining speed of determining the subspace object.

Manner 2: The data query apparatus performs subspace division on the multi-dimensional data, to obtain the plurality of subspace objects based on a distribution feature and a constraint condition of a subspace obtained through division.

In this embodiment, when the data range of data in each dimension in the multi-dimensional data is relatively large, there is a wide value range or a large floating-point precision of the data, resulting in a large data calculation amount or high calculation complexity during clustering. Therefore, in manner 2, the data query apparatus equally divides the data range of data in each dimension of the block in the multi-dimensional data into N intervals (N may be preset by a user).

Then, for data in each dimension of the block in the multi-dimensional data, the data query apparatus maps all data in the first interval in the dimension to 0; the data query apparatus maps all data in the second interval in the dimension to 1; and the data query apparatus maps all data in an $i^{th}$ interval in the dimension to i−1, so as to successively map all data in the dimension to 0 to N−1. In a same manner, the data query apparatus may map data in each dimension to 0 to N−1. It should be noted herein that 0 represents a value 0, i represents a value i, and if i is 5, it represents a value 5.

Figure 9:
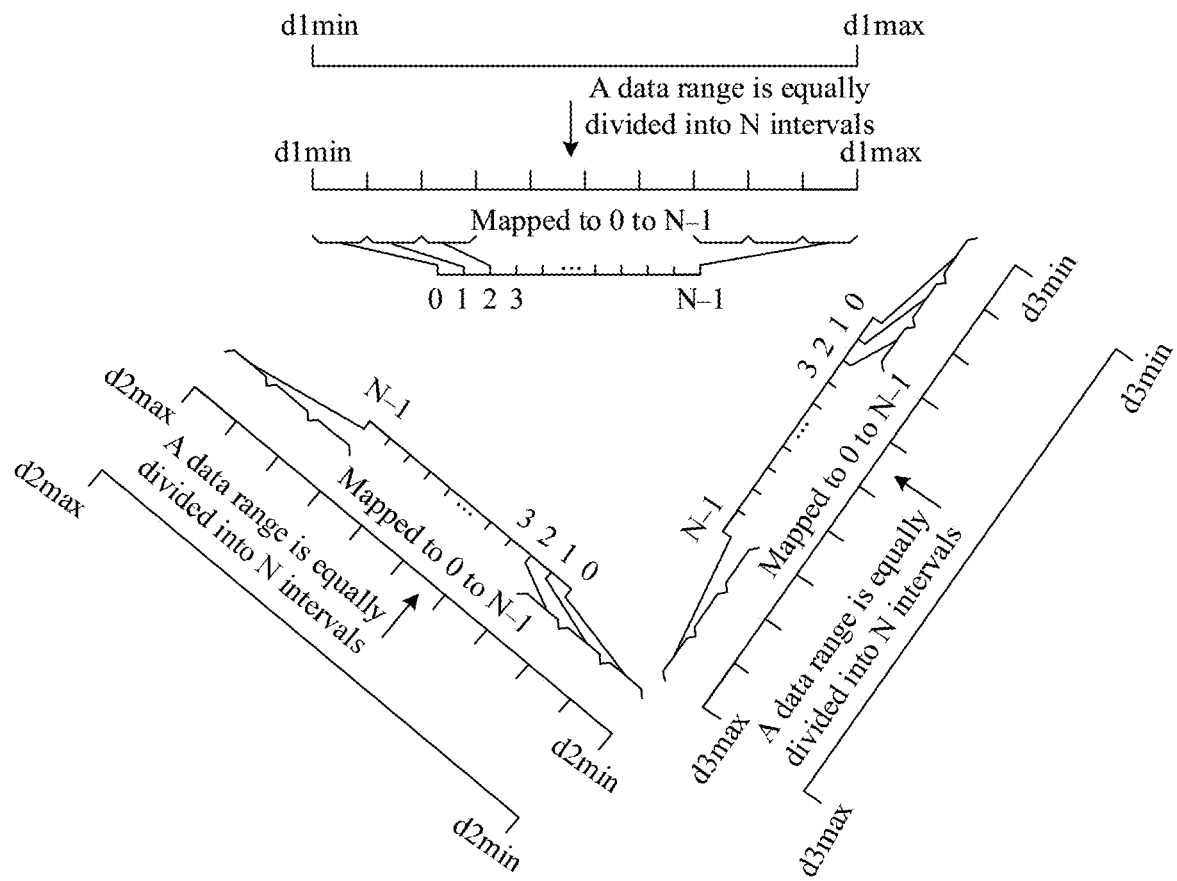
FIG. 9 is a schematic diagram of mapping data at equal intervals according to an example embodiment.

For example, as shown in FIG. 9, multi-dimensional data includes a d1 dimension, a d2 dimension, and a d3 dimension, data ranges in the d1 dimension, the d2 dimension, and the d3 dimension are equally divided into N intervals, d1 min represents a minimum value in data in the d1 dimension, d1max represents a maximum value in the data in the d1 dimension, d2 min represents a minimum value in data in the d2 dimension, d2max represents a maximum value in the data in the d2 dimension, d3 min represents a minimum value in data in the d3 dimension, and d3max represents a maximum value in the data in the d3 dimension.

Then, the data query apparatus constitutes a coordinate of a data point by using N values obtained after data in each dimension is mapped, that is, a subspace is obtained. The subspace is constituted by a coordinate of a data point of the multi-dimensional data. Then, the data query apparatus stores the coordinate of the data point and an id of data corresponding to the coordinate of the data point in a form of a key-value pair, where the key is the coordinate of the data point, and the value is the id of the data corresponding to the coordinate of the data point.

Figure 10A:
Figure 10A:

For example, as shown in FIG. 10A and FIG. 10B, 32000 pieces of data are considered as one block, ids of the data is taken from 1 to 32000, and three dimensions of the data of the block are represented as d1, d2, and d3. A value range of the data in each dimension is 0 to 9000. When N is 32, an interval is (9000−0)/32=281.25, that is, data with a value range of 0 to 281.25 (a left-closed and right-open interval may be taken) is mapped to 0, data in a range of 281.25 to 281.25*2 is mapped to 1, and so on. The value range of the mapped data in each dimension is 0 to 31. Coordinates of data points are (0,0,0), (0,0,1), (0,1,0), . . . , and (31,31,31). Data with ids 9, 256, 3150, 5460, and the like is mapped to a subspace (0,0,0), and no data is mapped to subspaces (0,0,2), (0,0,7), and the like.

The data query apparatus then merges subspaces, and obtains a maximum value and a minimum value of data of a merged subspace in each dimension, and each merged subspace is a subspace object. For each subspace object, a maximum value and a minimum value of data in each dimension of the subspace object form a data range of the subspace object in each dimension.

Specifically, a process in which the data query apparatus merges the subspaces may be as follows: Taking three-dimensional data as the multi-dimensional data as an example, the data query apparatus determines a volume 1 of a polyhedron formed by data corresponding to the subspace (0,0,0), and then the data query apparatus merges the subspace (0,0,0) and the subspace (0,1,0), and determines a volume 2 of the polyhedron formed by data corresponding to the two subspaces. The data query apparatus determines a difference between the volume 2 and the volume 1, and determines which of the difference and a second preset threshold (the second preset threshold may be preset by the user) is larger. If the difference is less than or equal to the second preset threshold, the subspace (0,0,0), the subspace (0,1,0), and the subspace (1,0,0) are merged (in a same manner as that of merging the subspace (0,0,0) and the subspace (0,1,0)). If the difference is greater than the second preset threshold, the data query apparatus separately determines the subspace (0,0,0) as a multi-dimensional subspace object. The data query apparatus may merge the subspace (0,1,0) and its closest subspace (in the same manner as that of merging the subspace (0,0,0) and the subspace (0,1,0)). All subspaces are merged in this manner to obtain the subspace objects of each block of the multi-dimensional data.

It should be noted that this is only one manner of merging the subspaces, and another manner may alternatively be used to merge the subspaces. For example, the subspaces may be merged based on a maximum time required for calculating the subspace objects, as a constraint condition; or based on a minimum data amount and a maximum data amount of the subspace object, as a constraint condition. In addition, both the second preset threshold and the first preset threshold herein are preset by the user, and may be equal or not equal.

In this way, compared with spatial clustering of unmapped data of each block, after dimension compression is performed on the data in manner 2 described above to obtain the subspace, a required data calculation amount is reduced, so that filtering performance of the data query can be improved. In addition, in manner 2, dimension compression and coding can be performed to obtain a subspace, provided that data of each block in each dimension is sortable, so that an application range is relatively wide.

Manner 3: The data query apparatus performs volume increment clustering on the multi-dimensional data to obtain the plurality of subspace objects.

In this embodiment, the data query apparatus groups a plurality of pieces of data in the multi-dimensional data into a cluster (which may be referred to as a first cluster), and then adds data to the first cluster. If a difference between a volume of the first cluster after the data is added and a volume of the first cluster without adding the data is less than a specific value, the data is added to the first cluster. If the difference between the volume of the first cluster after the data is added and the volume of the first cluster without adding the data is greater than or equal to the value, establishment of the first cluster is completed. The data query apparatus creates a new cluster (which may be referred to as a second cluster) and performs same processing as that performed on the first cluster until all data is traversed to obtain a final cluster. The data query apparatus uses each cluster as one subspace object. Then a data range of each subspace object in each dimension is determined. Certainly, another constraint condition, such as calculation performance or a data amount of each subspace object may also be used herein.

In addition, for each subspace object, an identifier further needs to be included to indicate a block to which the subspace object belongs, and the identifier is used to find the block in a subsequent data query process.

Figure 11:
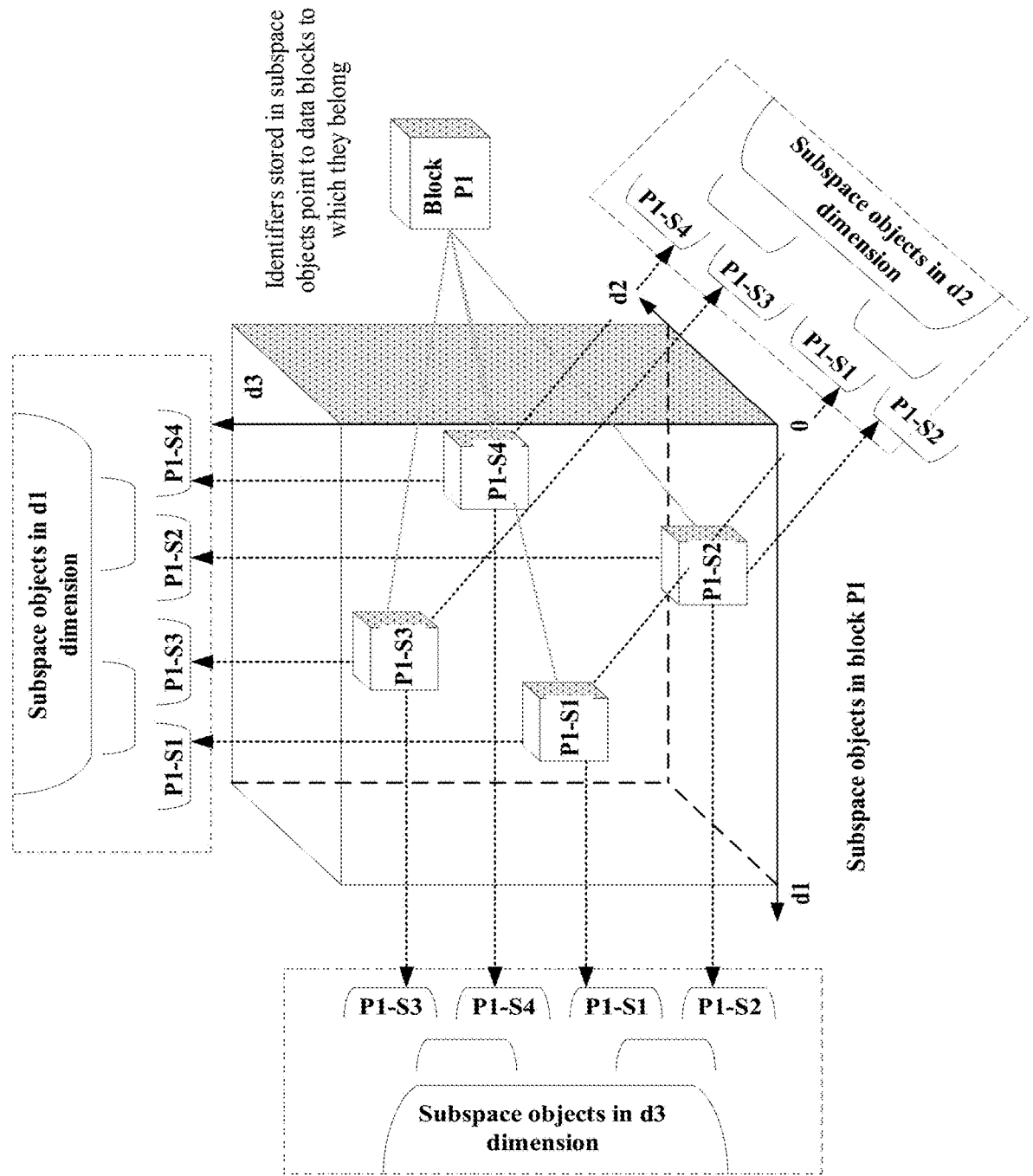
FIG. 11 is a schematic diagram of a subspace object of a single block according to an example embodiment.

After the subspace objects of each block are determined in step 504, subspace objects of a single block of the multi-dimensional data are subspace objects in a single block (P1) shown in FIG. 11, dimensions of data of block P1 are a d1 dimension, a d2 dimension, and a d3 dimension, and the subspace objects are represented by S1, S2, S3, S4, and the like. P1-S1 represents the first subspace object S1 in block P1, P1-S2 represents the second subspace object S2 in block P1, P1-S3 represents the third subspace object S3 in block P1, and P1-S4 represents the fourth subspace object S4 in block P1. In the d1 dimension, all the subspace objects of block P1 can be filtered. In the d2 dimension, all the subspace objects of block P1 can be filtered. In the d3 dimension, all the subspace objects of block P1 can be filtered.

Figure 12:
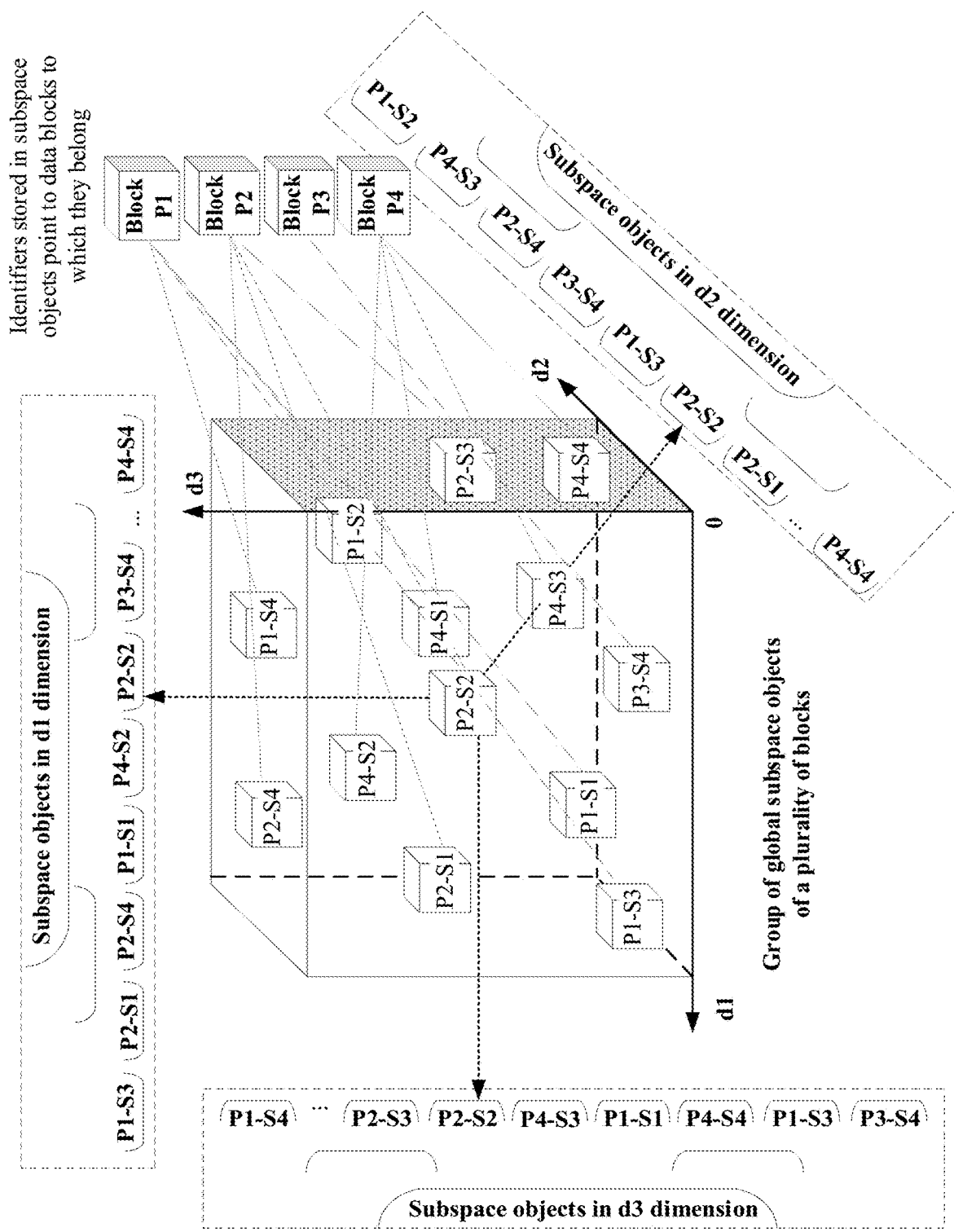
FIG. 12 is a schematic diagram of subspace objects of a plurality of blocks according to an example embodiment.

On the basis of FIG. 11, as shown in FIG. 12, an embodiment further provides all subspace objects (which may be referred to as global subspace objects) of a plurality of blocks of the multi-dimensional data, and the plurality of blocks are block P1, block P2, block P3, and block P4. Dimensions of data of block P1, block P2, block P3, and block P4 are the d1, d2, and d3 dimensions. P1-S1 represents the first subspace object S1 in block P1, P1-S2 represents the second subspace object S2 in block P1, P1-S3 represents the third subspace object S3 in block P1, and P1-S4 represents the fourth subspace object S4 in block P1. P2-S1 represents the first subspace object S1 in block P2, P2-S2 represents the second subspace object S2 in block P2, P2-S3 represents the third subspace object S3 in block P2, and P2-S4 represents the fourth subspace object S4 in block P2. P3-S1 represents the first subspace object S1 in block P3, P3-S2 represents the second subspace object S2 in block P3, P3-S3 represents the third subspace object S3 in block P3, and P3-S4 represents the fourth subspace object S4 in block P3. P4-S1 represents the first subspace object S1 in block P4, P4-S2 represents the second subspace object S2 in block P4, P4-S3 represents the third subspace object S3 in block P4, and P4-S4 represents the fourth subspace object S4 in block P4.

In this way, in subsequent data searching, in the d1 dimension, all the subspace objects of block P1, block P2, block P3, and block P4 can be filtered. In the d2 dimension, all the subspace objects of block P1, block P2, block P3, and block P4 can be filtered. In the d3 dimension, all the subspace objects of block P1, block P2, block P3, and block P4 can be filtered.

In FIG. 12, one identifier is stored in each subspace object, and the identifier is used to indicate a block to which the subspace object belongs.

Figure 13:
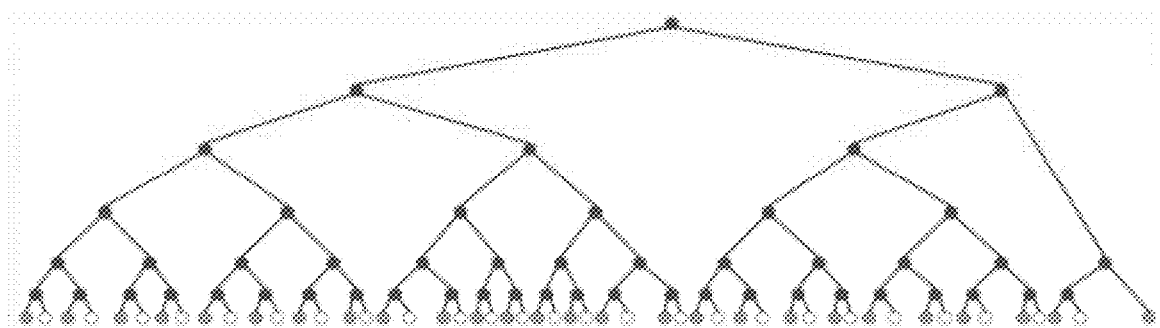
FIG. 13 is a schematic diagram of a segment tree according to an example embodiment.

In a possible implementation, to increase a data query speed, the data ranges of the plurality of subspace objects in the spatial distribution information of the multi-dimensional data in each dimension may constitute indexes. For subspace objects of data in any dimension in the multi-dimensional data, indexes of the subspace objects in the data range in each dimension can be represented by using a segment tree. Specifically, for data in any dimension, each subspace object of each block in the dimension is attached to a segment tree corresponding to the dimension within a value range in the dimension. The segment tree is a binary search tree, which stores a piece of interval information. Each node of the segment tree includes information such as a left endpoint and a right endpoint of an interval. For example, as shown in FIG. 13, for the global subspace objects in FIG. 12, the d1 dimension is used as an example to construct a segment tree corresponding to data in the dimension. The data query apparatus tiles data ranges of all subspaces in the d1 dimension to obtain all endpoint information. All the endpoint information forms a part of leaf nodes at the last layer of the segment tree, as shown by gray circles at the last layer in FIG. 13. Values of the other part of the leaf nodes at the last layer of the segment tree are determined based on the foregoing part of the leaf nodes, and may be specifically determined based on left leaf nodes adjacent thereto (the left leaf nodes may be referred to as sibling nodes). Then the data query apparatus successively constructs parent nodes upward based on the leaf nodes at the last layer until a root node is reached.

Figure 14:
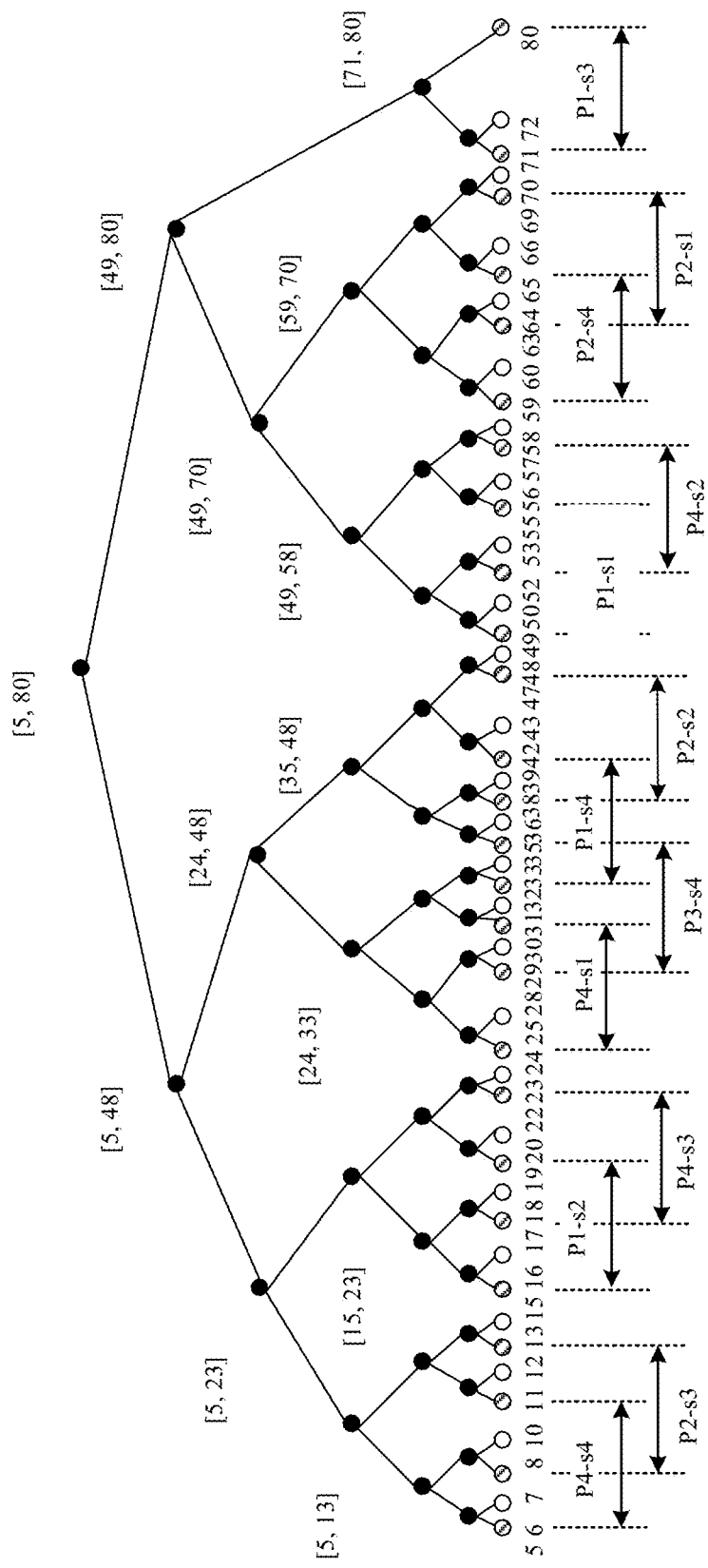
FIG. 14 is a storage schematic diagram of subspace objects of a plurality of blocks according to an example embodiment.

For example, in FIG. 14, the data range of each subspace object in the d1 dimension is expanded in ascending order of endpoints, such as P4-S4: [5, 10], P2-S3: [7, 12], P1-S2: [15, 19], P4-S3: [17, 22], P4-S1: [24, 30], P3-S4: [28, 35], P1-S4: [32, 42], P2-S2: [38, 47], P1-S1: [49, 55], P4-S2: [52, 57], P2-S4: [59, 65], P2-S1: [63, 69], P1-S3: [71, 80]. The data query apparatus considers the endpoints expanded in ascending order as a part of the leaf nodes at the last layer of the segment tree, as indicated by nodes shown by shaded circles at the last layer. The data query apparatus then determines the other part of the leaf nodes at the last layer of the segment tree. For each leaf node of the other part of the leaf nodes (shown by white circles in FIG. 14), the data query apparatus determines that a value of the leaf node is a number greater than that of a left sibling node (an adjacent leaf node on the left of the leaf node) (the left endpoint 5 of P4-S4 is the first leaf node, and a value of an adjacent leaf node on the right is 6 (greater than 5); the left endpoint of P2-S3 is 7, and a value of an adjacent leaf node on the right is 8 (greater than 7), and all leaf nodes are generated successively). The data query apparatus performs merging upward based on ranges to construct nodes at the penultimate layer of the segment tree, and successively performs merging upward until the root node is reached. The segment tree of the global subspace objects in the d1 dimension is constructed. In this way, when the d1 dimension is being queried, if data is greater than 49, a node on the right is queried directly; otherwise, a node on the left is queried.

In this way, with a structure shown in FIG. 14, the data query apparatus can retrieve a plurality of matched subspace objects from one dimension, and then filter the plurality of matched subspace objects in other dimensions without requiring a second query for subspace objects not matched in the first dimension, so that a data query can be performed efficiently.

Figure 15:
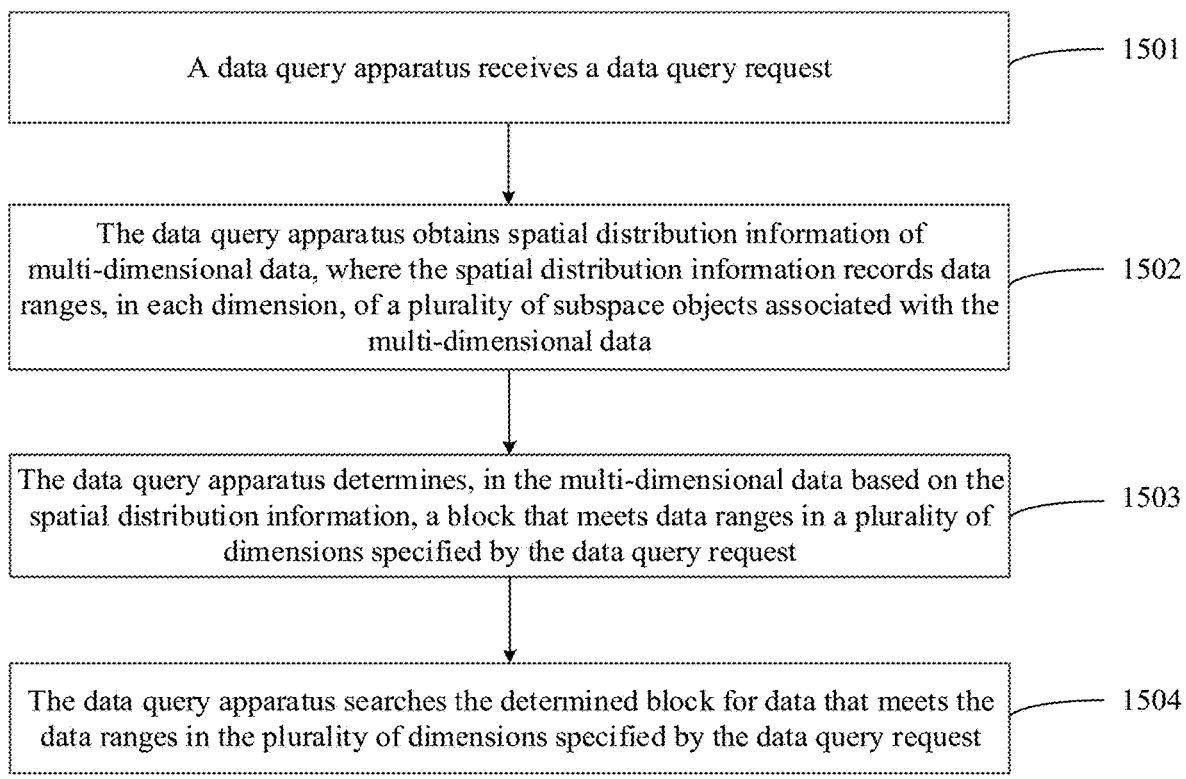
FIG. 15 is a schematic flowchart of a data query method according to an example embodiment.

As shown in FIG. 15, an embodiment further provides a data query process, and the processing is as follows:

Step 1501: A data query apparatus receives a data query request.

In this embodiment, when there is to-be-queried data, a user inputs a data query request to the data query apparatus (the data query request may be input through an interface or by using an SQL statement). The data query request specifies data ranges of to-be-queried multi-dimensional data.

For example, for the foregoing data table t_salary, the data query request may be as follows:

```
SELECT * FROM t_salary
WHERE
    (height>=1.62 && height<=1.64) &&
    (age>=27 && age<=38) &&
    (salary>=200 && salary<=300)
```

The foregoing data query request may be represented as obtaining data of height>=1.62 && height<=1.64, age>=27 && age<=38, and salary>=200 && salary<=300 from the data table t_salary. Corresponding to the data query request, the data ranges of the to-be-queried multi-dimensional data are height>=1.62 && height<=1.64, age>=27 && age<=38, and salary>=200 && salary<=300.

Step 1502: The data query apparatus obtains spatial distribution information of the multi-dimensional data, where the spatial distribution information records data ranges, in each dimension, of a plurality of subspace objects associated with the multi-dimensional data.

The multi-dimensional data comes from one data table or a plurality of data tables. The multi-dimensional data includes a plurality of blocks, where each block corresponds to a plurality of subspace objects, and each subspace object corresponds to a data range in each dimension.

In this embodiment, the data query apparatus may obtain the spatial distribution information of the multi-dimensional data, where the spatial distribution information records the data ranges, in each dimension, of the plurality of subspace objects associated with the multi-dimensional data. Specifically, the data query apparatus may store the spatial distribution information of the multi-dimensional data itself, or may obtain the spatial distribution information of the multi-dimensional data from another device.

Step 1503: The data query apparatus determines, from the multi-dimensional data based on the spatial distribution information, a block that meets data ranges in a plurality of dimensions specified by the data query request.

In this embodiment, the data query apparatus may determine, from the multi-dimensional data based on the spatial distribution information, a to-be-queried block within the data ranges in the plurality of dimensions.

Step 1504: The data query apparatus searches the determined block for data that meets the data ranges in the plurality of dimensions specified by the data query request.

In this embodiment, the data query apparatus may find, in the determined block by using the to-be-queried data ranges in the plurality of dimensions, data indicated by the data ranges in the plurality of dimensions. The data query apparatus may feed back the found data to a device sending the data query request, so that the device obtains the to-be-queried data in time.

If the data indicated by the data ranges in the plurality of dimensions is not found in the determined block, it is fed back that no data meeting the data query request exists to the device sending the data query request.

In a possible implementation, in step 1503, the processing of determining the block may be as follows:

The data query apparatus determines, from the plurality of subspace objects based on the spatial distribution information of the multi-dimensional data, one or more subspace objects that meet the data ranges in the plurality of dimensions specified by the data query request; and use a block to which the determined subspace object belongs as a block that meets the data ranges in the plurality of dimensions specified by the data query request.

In this embodiment, the data query apparatus may match the spatial distribution information of the multi-dimensional data with the data range of data in each dimension in the data ranges of the multi-dimensional data specified by the data query request, and filter out a subspace object that does not include the data ranges of the multi-dimensional data. A remaining subspace object is a subspace object that may have the data ranges of the multi-dimensional data. The data query apparatus determines a block to which the remaining subspace object belongs as a block that meets the data ranges of the multi-dimensional data. Specifically, the data query apparatus may match the data range of data in each of the plurality of dimensions with the spatial distribution information of the multi-dimensional data to obtain subspace objects that the data range in each dimension meets. The data query apparatus obtains an intersection set of the subspace objects that the data range in each dimension meets, to obtain subspace objects that meet the data ranges in the plurality of dimensions. The data query apparatus determines blocks indicated by identifiers of the subspace objects as blocks that meet the data ranges of the multi-dimensional data.

In a possible implementation, when no subspace object is found using the spatial distribution information of the multi-dimensional data, the processing may be as follows:

When no subspace object that meets the data ranges in the plurality of dimensions specified by the data query request is found in the plurality of subspace objects based on the spatial distribution information of the multi-dimensional data, the data query apparatus feeds back that no data meeting the data query request exists.

In this embodiment, when the data query apparatus finds, in the plurality of subspace objects of the multi-dimensional data, no subspace object that meets the data ranges in the plurality of dimensions, the data query apparatus may feed back that no data meeting the data query request exists to the device sending the data query request, so that the device sending the data query request can know a query result in time.

In a possible implementation, the multi-dimensional data may be divided into a plurality of levels. For example, the multi-dimensional data is divided into a first-level and a second-level. Correspondingly, the first-level may include a plurality of first-level blocks, and the second-level may include a plurality of second-level blocks. A second-level block is obtained by dividing a first-level block, and a plurality of second-level blocks form one first-level block. The processing in step 1503 may be as follows:

The data query apparatus obtains spatial distribution information of first-level blocks of the multi-dimensional data, where the spatial distribution information of the first-level blocks records data ranges, in each dimension, of a plurality of subspace objects associated with data of the first-level blocks; and obtains spatial distribution information of second-level blocks of a target block, where the spatial distribution information of the second-level blocks records data ranges, in each dimension, of a plurality of subspace objects associated with data of the second-level blocks. The data query apparatus determines, from the first-level blocks based on the spatial distribution information of the first-level blocks, a target block that meets the data ranges in the plurality of dimensions specified by the data query request; and determines, from the target block based on the spatial distribution information of the second-level blocks, a second-level block that meets the data ranges in the plurality of dimensions specified by the data query request.

In this embodiment, the data query apparatus may obtain the spatial distribution information of the first-level blocks and the spatial distribution information of the second-level blocks of the multi-dimensional data. The spatial distribution information of the first-level blocks may record the data ranges, in each dimension, of the plurality of subspace objects associated with the data of the first-level blocks. The spatial distribution information of the second-level blocks may record the data ranges, in each dimension, of the plurality of subspace objects associated with the data of the second-level blocks.

The data query apparatus may first determine, from the first-level blocks based on the spatial distribution information of the first-level blocks, one or more subspace objects that meet the data ranges in the plurality of dimensions. The data query apparatus determines one or more blocks corresponding to one or more identifiers of the one or more subspace objects as one or more target blocks. The data query apparatus then determines second-level blocks included in the target block, determines, from these second-level blocks by using spatial distribution information of these second-level blocks, one or more subspace objects that meet the data ranges in the plurality of dimensions, and determines one or more second-level blocks corresponding to one or more identifiers of the one or more subspace objects as one or more second-level blocks that meet the data ranges in the plurality of dimensions specified by the data query request.

In this way, first-level blocks are first filtered to filter out a first-level block that does not include to-be-queried data within the data ranges of the multi-dimensional data; and second-level blocks in a remaining first-level block are filtered, so that a data query speed can be increased.

It should be noted that the first-level block may be a file block, and the second-level block may be a data block. Only two levels are obtained through division in the foregoing. In the data query process, a plurality of levels can be obtained through division based on actual needs.

In a possible implementation, after step 1504, if the spatial distribution information of the multi-dimensional data in this step is not used subsequently, the spatial distribution information of the multi-dimensional data may be deleted to save storage space of the data query apparatus. Specifically, for the data table t_salary described above, the data query apparatus may receive a deletion request which may be expressed as: deleting the spatial distribution information of the multi-dimensional data of the data table t_salary. In addition, when the spatial distribution information of the multi-dimensional data includes the spatial distribution information of the multi-dimensional data of the first-level blocks and the spatial distribution information of the multi-dimensional data of the second-level blocks, it is further necessary to indicate which type of the spatial distribution information is to be deleted, for example, the deletion request may carry an identifier used to indicate whether the spatial distribution information to be deleted is the spatial distribution information of the first-level blocks or the second-level blocks.

In a possible implementation, when the data in the data table is incrementally updated, only the incrementally updated data needs to be added to an original subspace object, and a cost of re-learning the spatial distribution information of the multi-dimensional data is small.

According to this embodiment, for data that is spatially adjacent to each other but relatively scattered on a physical memory, the spatial distribution information of the multi-dimensional data is constructed by learning spatial distribution information of the data, so that a query can be effectively filtered, ineffective reading and analysis of a large quantity of blocks can be reduced, ineffective reading of an entire block of disk input/output (TO) can be reduced, and storage performance can be improved.

It should be noted that when the user is described in the foregoing embodiment, the user is described as an operation and maintenance person, but the user may not be actually an operation and maintenance person, and may be a user who has a permission to use the foregoing data query apparatus.

It should also be noted that, the multi-dimensional data is only logically divided into blocks, spatial distribution information (that is, subspace objects) corresponding to the logically divided blocks is learned, a correspondence relationship between blocks and subspace objects of the blocks is established, and data of the blocks obtained after the multi-dimensional data is divided is not stored together.

Figure 16:
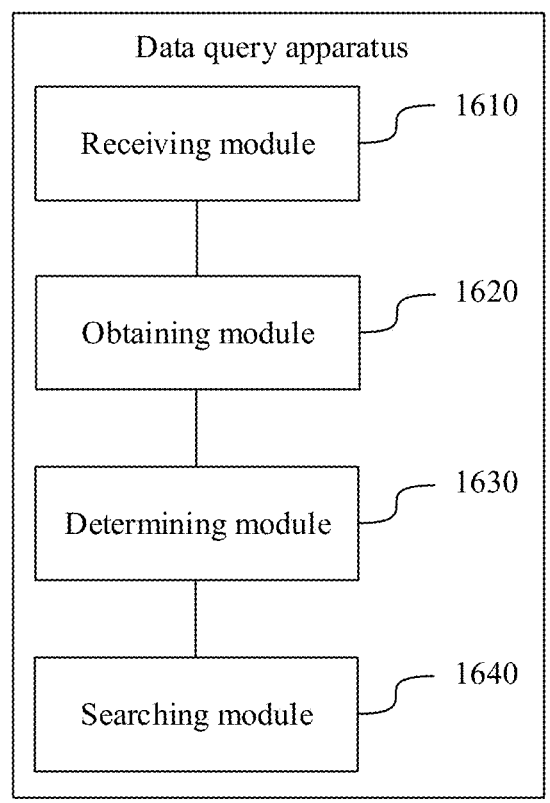
FIG. 16 is a schematic diagram of a structure of a data query apparatus according to an example embodiment.

FIG. 16 is a diagram of a structure of a data query apparatus according to an embodiment. The apparatus may be implemented as a part or the entire of the apparatus by using software, hardware, or a combination thereof. The apparatus provided in this embodiment may implement the process of FIG. 15 of the embodiment. The apparatus includes a receiving module 1610, an obtaining module 1620, a determining module 1630, and a searching module 1640.

The receiving module 1610 is configured to receive a data query request, where the data query request specifies data ranges in a plurality of dimensions, and may be further configured to perform a receiving function of step 1501 and an implied step included therein.

The obtaining module 1620 is configured to obtain spatial distribution information of multi-dimensional data, where the spatial distribution information records data ranges, in each dimension, of a plurality of subspace objects associated with the multi-dimensional data; and may be further configured to perform an obtaining function of step 1502 and an implied step included therein.

The determining module 1630 is configured to determine, from the multi-dimensional data based on the spatial distribution information, a block that meets the data ranges in the plurality of dimensions specified by the data query request, and may be further configured to perform a determining function of step 1503 and an implied step included therein.

The searching module 1640 is configured to search the determined block for data that meets the data ranges in the plurality of dimensions specified by the data query request, and may be further configured to perform a searching function of step 1504 and an implied step included therein.

In a possible implementation, the determining module 1630 is configured to: determine, from the plurality of subspace objects based on the spatial distribution information of the multi-dimensional data, one or more subspace objects that meet the data ranges in the plurality of dimensions specified by the data query request; and use a block to which the determined subspace object belongs as a block that meets the data ranges in the plurality of dimensions specified by the data query request.

In a possible implementation, the searching module 1640 is further configured to: when no subspace object that meets the data ranges in the plurality of dimensions specified by the data query request is found in the plurality of subspace objects based on the spatial distribution information of the multi-dimensional data, feed back that no data meeting the data query request exists.

In a possible implementation, the obtaining module 1620 is configured to: obtain spatial distribution information of first-level blocks of the multi-dimensional data, where the spatial distribution information of the first-level blocks records data ranges, in each dimension, of a plurality of subspace objects associated with data of the first-level blocks; and obtain spatial distribution information of second-level blocks of the multi-dimensional data, where the spatial distribution information of the second-level blocks records data ranges, in each dimension, of a plurality of subspace objects associated with data of the second-level blocks; and the determining module 1630 is configured to: determine, from the first-level blocks based on the spatial distribution information of the first-level blocks, a target block that meets the data ranges in the plurality of dimensions specified by the data query request; and determine, from the target block based on the spatial distribution information of the second-level blocks, a second-level block that meets the data ranges in the plurality of dimensions specified by the data query request.

In a possible implementation, the determining module 1630 is further configured to: determine the plurality of subspace objects of the multi-dimensional data based on a distribution feature and a constraint condition of the multi-dimensional data in a multi-dimensional space.

In a possible implementation, the determining module 1630 is further configured to: perform dimension reduction on the multi-dimensional data to obtain dimension-reduced data; and determine the plurality of subspace objects based on a distribution feature and a constraint condition of the dimension-reduced data in a low-dimensional space.

In a possible implementation, the determining module 1630 is further configured to: perform volume increment clustering on the multi-dimensional data to obtain the plurality of subspace objects.

In a possible implementation, the determining module 1630 is further configured to: perform subspace division on the multi-dimensional data, to obtain the plurality of subspace objects based on a distribution feature and a constraint condition of a subspace obtained through division.

In a possible implementation, the data ranges of the plurality of subspace objects in each dimension form indexes of the plurality of subspace objects.

Division of the modules in the embodiments is an example, and is merely logical function division. There may be another division manner during actual implementation. In addition, the functional modules in the embodiments may be integrated into one processor, or each of the functional modules may exist alone physically, or two or more modules may be integrated into one module. The integrated module may be implemented in a form of hardware, or may be implemented in a form of a software function module.

It should be noted that, when the data query apparatus provided in the foregoing embodiments performs data query, the division of the foregoing functional modules is merely used as an example. In actual application, allocation of the foregoing functions can be completed by different functional modules based on a requirement, that is, the internal structure of the apparatus is divided into different functional modules to implement all or some of the foregoing functions described above. In addition, the data query apparatus and the data query method provided in the foregoing embodiments belong to a same conception. For a specific implementation process thereof, refer to the method embodiments. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (digital versatile disc (DVD)), a semiconductor medium (for example, a solid-state drive (SSD)).

What is claimed is:

1. A method comprising:
   receiving a data query request specifying data ranges in a plurality of dimensions;
   determining a plurality of subspace objects of each block of the multi-dimensional data based on a distribution feature and a constraint condition of multi-dimensional data in a multi-dimensional space to obtain spatial distribution information of the multi-dimensional data, wherein the spatial distribution information records data ranges in each dimension of the subspace objects associated with the multi-dimensional data, wherein the subspace objects are formed by performing spatial clustering on the multi-dimensional data;

determining, from the multi-dimensional data and based on the spatial distribution information, a block that meets the data ranges; and searching the block for data that meet the data ranges.

2. The method of claim 1, wherein determining the block comprises:

determining, from the subspace objects and based on the spatial distribution information, whether a first subspace object meets the data ranges; and using, when the first subspace object meets the data ranges, a first block to which the first subspace object belongs as the block.

3. The method of claim 2, further comprising feeding back, when none of the subspace objects meet the data ranges, that no data meet the data query request.

4. The method of claim 1, wherein obtaining the spatial distribution information comprises:

obtaining first spatial distribution information of first-level blocks of the multi-dimensional data, wherein the first spatial distribution information records first data ranges in each dimension of a plurality of first subspace objects associated with first data of the first-level blocks; and obtaining second spatial distribution information of second-level blocks of the multi-dimensional data, wherein the second spatial distribution information records second data ranges in each dimension of a plurality of second subspace objects associated with second data of the second-level blocks, and wherein determining the block comprises:

determining, from the first-level blocks and based on the first spatial distribution information, a target first-level block that meets the data ranges; and determining, from the target first-level block and based on the second spatial distribution information, a target second-level block that meets the data ranges.

5. The method of claim 1, further comprising:

performing dimension reduction on the multi-dimensional data to obtain dimension-reduced data; and determining the subspace objects of the dimension-reduced data in a low-dimensional space, wherein the distribution feature and the constraint condition are of the dimension-reduced data.

6. The method of claim 1, further comprising determining the subspace objects by performing volume increment clustering on the multi-dimensional data.

7. The method of claim 1, further comprising determining the subspace objects by performing subspace division on the multi-dimensional data to obtain the subspace objects, wherein the distribution feature and the constraint condition are of a subspace resulting from the subspace division.

8. The method of claim 1, wherein the data ranges form indexes of the subspace objects.

9. A computing device comprising:

a memory configured to store instructions; and a processor coupled to the memory and configured to execute the instructions to cause the computing device to:

receive a data query request specifying data ranges in a plurality of dimensions;

determine a plurality of subspace objects of each block of multi-dimensional data based on a distribution feature and a constraint condition of multi-dimensional data in a multi-dimensional space to obtain spatial distribution information of the multi-dimensional data, wherein the spatial distribution information records data ranges in each dimension of the subspace objects associated with the multi-dimensional data, wherein the subspace objects are formed by performing spatial clustering on the multi-dimensional data;

determine, from the multi-dimensional data and based on the spatial distribution information, a block that meets the data ranges; and search the block for data that meet the data ranges.

10. The computing device of claim 9, wherein the processor is further configured to execute the instructions to cause the computing device to further determine the block by:

determining, from the subspace objects and based on the spatial distribution information, whether a first subspace object meets the data ranges; and using, when the first subspace object meets the data ranges, a first block to which the first subspace object belongs as the block.

11. The computing device of claim 10, wherein the processor is further configured to execute the instructions to cause the computing device to feed back, when none of the subspace objects meet the data ranges, that no data meet the data query request.

12. The computing device of claim 9, wherein the processor is further configured to execute the instructions to cause the computing device to:

further obtain the spatial distribution information by:

obtaining first spatial distribution information of first-level blocks of the multi-dimensional data, wherein the first spatial distribution information records first data ranges in each dimension of a plurality of first subspace objects associated with first data of the first-level blocks; and obtaining second spatial distribution information of second-level blocks of the multi-dimensional data, wherein the second spatial distribution information records second data ranges in each dimension of a plurality of second subspace objects associated with second data of the second-level blocks; and further determine the block by:

determining, from the first-level blocks and based on the first spatial distribution information, a target first-level block that meets the data ranges; and determining, from the target first-level block and based on the second spatial distribution information, a target second-level block that meets the data ranges.

13. The computing device of claim 9, wherein the processor is further configured to execute the instructions to cause the computing device to:

perform dimension reduction on the multi-dimensional data to obtain dimension-reduced data; and further determine the subspace objects of the dimension-reduced data in a low-dimensional space, wherein the distribution feature and the constraint condition are of the dimension-reduced data.

14. The computing device of claim 9, wherein the processor is further configured to execute the instructions to cause the computing device to determine the subspace objects by performing volume increment clustering on the multi-dimensional data.

15. The computing device of claim 9, wherein the processor is further configured to execute the instructions to cause the computing device to perform subspace division on the multi-dimensional data to obtain the subspace objects, and wherein the distribution feature and the constraint condition are of a subspace resulting from the subspace division.

16. The computing device of claim 9, wherein the data ranges form indexes of the subspace objects.

17. A computer program product comprising instructions that are stored on a computer-readable medium and that, when executed by a processor, cause a computing device to:
- receive a data query request specifying data ranges in a plurality of dimensions;
- determine a plurality of subspace objects of each block of multi-dimensional data based on a distribution feature and a constraint condition of multi-dimensional data in a multi-dimensional space to obtain spatial distribution information of the multi-dimensional data, wherein the spatial distribution information records data ranges in each dimension of the subspace objects associated with the multi-dimensional data, wherein the subspace objects are formed by performing spatial clustering on the multi-dimensional data;
- determine, from the multi-dimensional data and based on the spatial distribution information, a block that meets the data ranges; and
- search the block for data that meet the data ranges.

18. The computing device of claim 17, wherein the instructions, when executed by the processor, further cause the computing device to further determine the block by:
- determining, from the subspace objects and based on the spatial distribution information, whether a first subspace object meets the data ranges; and
- using, when the first subspace object meets the data ranges, a first block to which the first subspace object belongs as the block.

19. The computing device of claim 17, wherein the instructions, when executed by the processor, further cause the computing device to fed back, when none of the subspace objects meet the data ranges, that no data meet the data query request.

20. The computing device of claim 17, wherein the data ranges form indexes of the subspace objects.

* * * * *